US008578297B2

(12) United States Patent
Webster et al.

(10) Patent No.: US 8,578,297 B2
(45) Date of Patent: Nov. 5, 2013

(54) METHOD OF BROWSING MEDIA ITEMS USING THUMBNAILS

(75) Inventors: Steven David Webster, Scotland Island (AU); Ernest Yiu Cheong Wan, Carlingford (AU)

(73) Assignee: Canon Kabushiki Kaisha, Tokyo (JP)

(*) Notice: Subject to any disclaimer, the term of this patent is extended or adjusted under 35 U.S.C. 154(b) by 858 days.

(21) Appl. No.: 12/324,777

(22) Filed: Nov. 26, 2008

(65) Prior Publication Data

US 2009/0164944 A1    Jun. 25, 2009

(30) Foreign Application Priority Data

Dec. 20, 2007   (AU) ................................ 2007249153

(51) Int. Cl.
*G06F 3/0481*   (2013.01)
(52) U.S. Cl.
USPC ........... 715/838; 715/735; 715/241; 715/802; 715/851; 345/156; 345/157
(58) Field of Classification Search
USPC ........................................................ 715/838
See application file for complete search history.

(56) References Cited

U.S. PATENT DOCUMENTS

| | | | | |
|---|---|---|---|---|
| 5,499,330 A * | 3/1996 | Lucas et al. | ................... | 715/205 |
| 6,466,237 B1 * | 10/2002 | Miyao et al. | ................... | 715/838 |
| 6,788,288 B2 * | 9/2004 | Ano | ................... | 345/157 |
| 7,091,998 B2 * | 8/2006 | Miller-Smith | ............... | 715/810 |
| 7,099,946 B2 | 8/2006 | Lennon et al. | ............... | 709/227 |
| 7,461,168 B1 | 12/2008 | Wan | ................... | 709/245 |
| 7,797,641 B2 * | 9/2010 | Karukka et al. | ............... | 715/802 |
| 2001/0033302 A1 * | 10/2001 | Lloyd-Jones et al. | ......... | 345/853 |
| 2002/0033848 A1 * | 3/2002 | Sciammarella et al. | ...... | 345/838 |
| 2002/0152267 A1 * | 10/2002 | Lennon | ......................... | 709/203 |
| 2003/0050721 A1 * | 3/2003 | Yasushi et al. | ................... | 700/94 |
| 2003/0081011 A1 | 5/2003 | Sheldon et al. | ............... | 345/838 |
| 2003/0233618 A1 | 12/2003 | Wan | ............................ | 715/513 |
| 2004/0261031 A1 * | 12/2004 | Tuomainen et al. | .......... | 715/739 |

(Continued)

FOREIGN PATENT DOCUMENTS

WO      2006/126050      11/2006

OTHER PUBLICATIONS

Adobe Photoshop album starter 3.0, Adobe, released on Jun. 7, 2005, screenshot of working program, pp. 1-8.*

(Continued)

*Primary Examiner* — William Bashore
*Assistant Examiner* — Reza Nabi
(74) *Attorney, Agent, or Firm* — Fitzpatrick, Cella, Harper & Scinto

(57) ABSTRACT

Disclosed is a method of browsing a set of media items on a display device. A sequence of thumbnail images corresponding to a portion of the set are initially displayed in a looping arrangement. A first thumbnail image of the sequence is displayed at a size larger than other thumbnail images of the sequence. The first thumbnail image corresponds to a focus position in the sequence. The arrangement responds to a user scrolling action to replace display of a second thumbnail image adjacent to an insertion point in the displayed sequence with a third thumbnail image corresponding to a media item of the set not displayed prior to the user action. The method then updates the focus position and insertion point and replaces a display of the first thumbnail image with display of a fourth thumbnail image corresponding to the updated focus position.

19 Claims, 18 Drawing Sheets

(56) References Cited

U.S. PATENT DOCUMENTS

| | | | |
|---|---|---|---|
| 2005/0010955 A1* | 1/2005 | Elia et al. | 725/88 |
| 2005/0289482 A1* | 12/2005 | Anthony et al. | 715/851 |
| 2006/0248475 A1* | 11/2006 | Abrahamsson | 715/835 |
| 2006/0268100 A1* | 11/2006 | Karukka et al. | 348/14.01 |
| 2006/0274362 A1* | 12/2006 | Kita | 358/1.15 |
| 2007/0290999 A1* | 12/2007 | Cho et al. | 345/158 |
| 2008/0024444 A1* | 1/2008 | Abe et al. | 345/157 |
| 2008/0062141 A1* | 3/2008 | Chandhri | 345/173 |
| 2008/0155617 A1* | 6/2008 | Angiolillo et al. | 725/93 |
| 2008/0168382 A1* | 7/2008 | Louch et al. | 715/781 |
| 2009/0002335 A1* | 1/2009 | Chaudhri | 345/173 |
| 2009/0113350 A1* | 4/2009 | Hibino et al. | 715/853 |
| 2009/0204920 A1* | 8/2009 | Beverley et al. | 715/768 |
| 2011/0138274 A1* | 6/2011 | Hoshino et al. | 715/273 |

OTHER PUBLICATIONS

Australian Examination Report dated Feb. 5, 2010 in corresponding Australian Application No. 2007249153.

* cited by examiner

METHOD OF BROWSING MEDIA ITEMS USING THUMBNAILS

CROSS-REFERENCE TO RELATED PATENT APPLICATIONS

This application claims the right of priority under 35 U.S.C. §119 based on Australian Patent Application No. 2007249153, filed Dec. 20, 2007, which is incorporated by reference herein in its entirety as if fully set forth herein.

TECHNICAL FIELD

The current invention relates to the digital storage and management of media items and, in particular, to a media management application that incorporates browsing the media items.

BACKGROUND

With the increased usage of digital storage of media items such as photographs, videos and other electronic documents, methods of browsing and retrieving these digitally stored items have been developed. A common operation, when interacting with devices which give access to media items in a collection, is to search by browsing. Thumbnail images (hereafter "thumbnails"), which may be graphical or bitmap, corresponding to media items are presented on a display device and the user may choose between different thumbnails using an input device which may contain buttons or a scroll-wheel. Whilst thumbnails are often associated with image data to be display or reproduced, they can also be associated with other data, such a stored telephone number in a mobile telephone handset, or a sound file, where the thumbnail may be an album cover or something else associated with musical content. As more thumbnails may be present in the collection than will fit or otherwise be able to be displayed on the display device at the same time, a mechanism is usually incorporated to allow the displayed thumbnails to be replaced with new ones from the collection.

As it may be hard to discern the contents of the thumbnails in view of their relatively small size and the typical small size portable display on which they are often presented, it is common for a copy of the selected thumbnail to be shown at a larger size as a "preview" image. This allows the user to inspect the image in more detail. This approach also has the benefit of allowing the user to fix or focus their gaze on the larger image whilst scrolling through the thumbnails. The preview image is repeatedly updated with new images for efficient browsing. When the user wishes to check adjacent images, scrolling can be stopped and the adjacent thumbnails inspected.

One problem with these interfaces is that significant processing is required to update the thumbnail information. When scrolling, many thumbnails may need to be updated for each user action. If a scrolling animation is used, this may require significant computing resources. Embedded devices such as digital cameras or printers, which incorporate LCD displays, may use low cost processors with limited capabilities which can exacerbate this problem.

Another problem is that scrolling causes all the thumbnails to move. This may be visually distracting for the user.

SUMMARY

It is an object of the present invention to substantially overcome or at least ameliorate one or more deficiencies of known arrangements.

In accordance with one aspect of the present disclosure there is provided a method of browsing a set of media items on a display device, said method comprising the steps of:

displaying a sequence of thumbnail images corresponding to a portion of said set in a looping arrangement;

displaying a first thumbnail image of said sequence at a size larger than other thumbnail images of said sequence, wherein said first thumbnail image corresponds to a focus position in said sequence;

responding to a user action by:

replacing display of a second thumbnail image adjacent to an insertion point in said displayed sequence with a third thumbnail image corresponding to a media item of said set not displayed prior to the user action;

updating the focus position and insertion point; and replacing a display of said first thumbnail image with display of a fourth thumbnail image corresponding to the updated focus position.

In accordance with another aspect of the present disclosure there is provided a method of browsing a set of media items in a graphical user interface represented on a display device, said method comprising the steps of:

(a) displaying a sequence of thumbnails each corresponding to a media item of a portion of said set, said sequence being displayed around a preview region in a looping arrangement, the displayed sequence having a thumbnail insertion position that moves relative to a focus position, said focus position defining a focus media item of the set;

(b) displaying a further thumbnail representation in said preview region, said further thumbnail corresponding to a first thumbnail currently in the focus position;

(c) responding to scrolling action of a user of said graphical user interface by:

(i) advancing said focus position from said first thumbnail to an adjacent second thumbnail in a scrolling direction associated with the scrolling action;

(ii) removing from the display a third thumbnail that is immediately ahead of said insertion position in the scrolling direction;

(iii) inserting and displaying in the sequence a fourth thumbnail ahead of said insertion position in the scrolling direction wherein said fourth thumbnail is next to the thumbnail immediately behind said insertion position in said sequence of thumbnails, said fourth thumbnail corresponding to a media item of said set not displayed prior to the scrolling action;

(iv) advancing said insertion position to a position just before said inserted fourth thumbnail.

displaying a representation corresponding to the media item that corresponds to said second thumbnail in said preview region;

wherein steps (i) to (v) are performed without moving the remaining thumbnails of the displayed sequence on the display.

A number of other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 14:
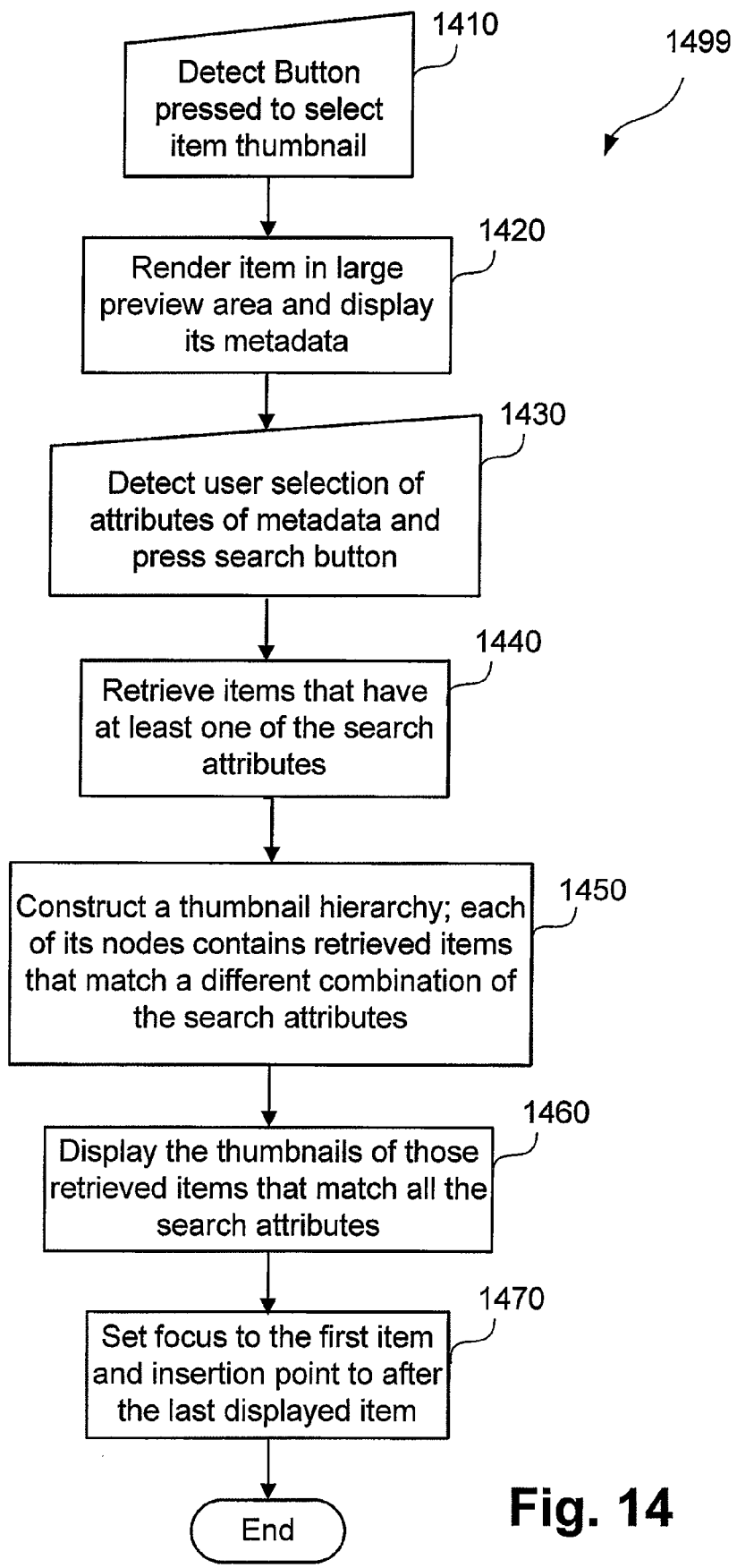
FIG. 14 is a flowchart of performing a search within a hierarchical GUI.
Figure 15:
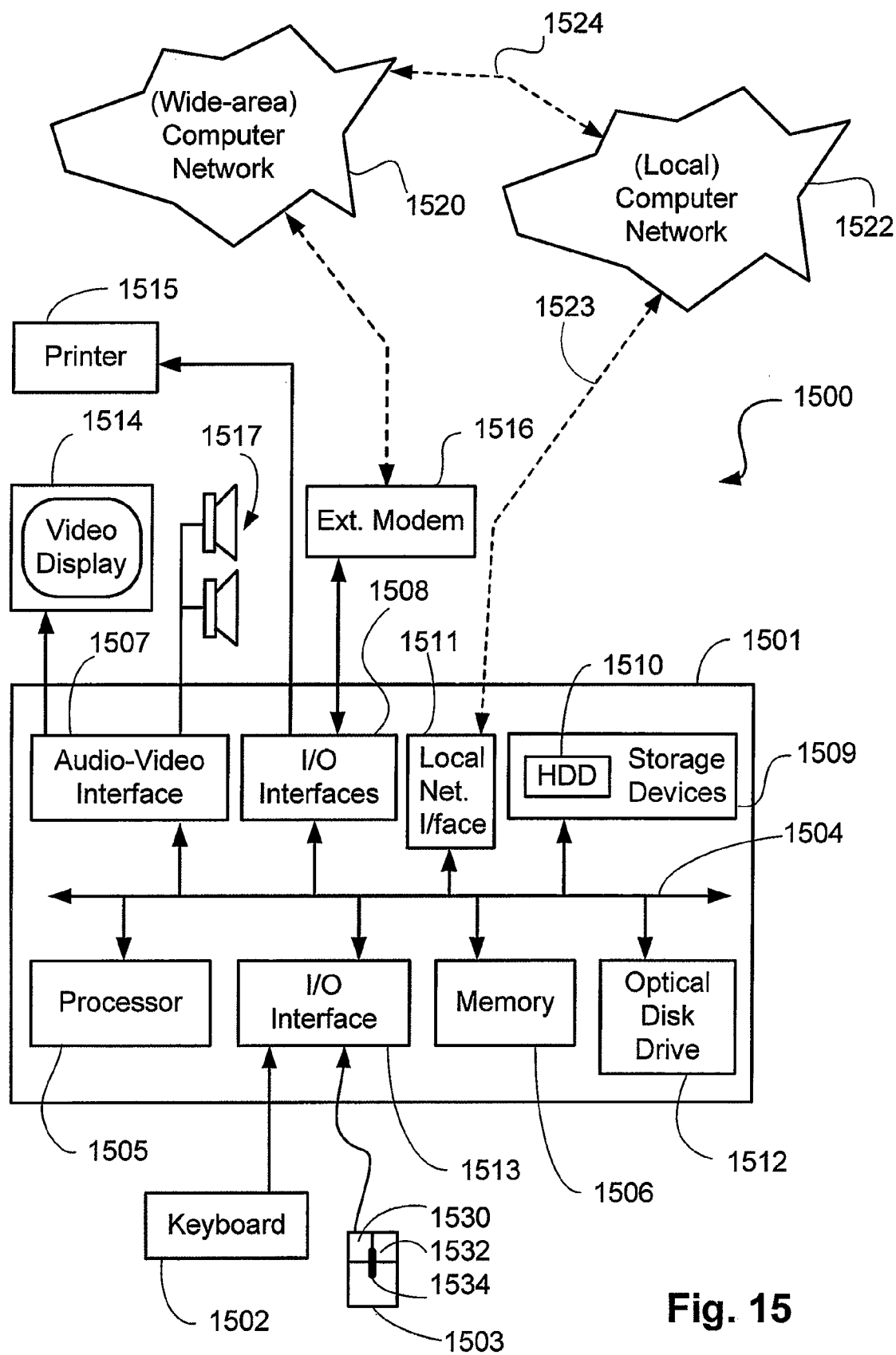
FIG. 15 is a schematic block diagram representation of a general purpose computer system by which the media browsers described herein may be implemented.

The methods of media item display and browsing to be described may be implemented using a general purpose computer system 1500, such as that shown in FIG. 15 wherein the processes of FIGS. 1 to 14 may be implemented as software, such as one or more application programs executable within the computer system 1500. In particular, the steps of the method of browsing are effected by instructions in the software that are carried out within the computer system 1500. The instructions may be formed as one or more code modules, each for performing one or more particular tasks. The software may also be divided into two separate parts, in which a first part and the corresponding code modules performs the data retrieving and management methods and a second part and the corresponding code modules manage a user interface between the first part and the user to result in the display of the data so retrieved. The software may be stored in a computer readable medium, including the storage devices described below, for example. The software is loaded into the computer system 1500 from the computer readable medium, and then executed by the computer system 1500. A computer readable medium having such software or computer program recorded on it is a computer program product. The use of the computer program product in the computer system 1500 preferably effects an advantageous apparatus for media browsing.

As seen in FIG. 15, the computer system 1500 is formed by a computer module 1501, input devices such as a keyboard 1502 and a mouse pointer device 1503, and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The network 1520 may be a wide-area network (WAN), such as the Internet or a private WAN. Where the connection 1521 is a telephone line, the modem 1516 may be a traditional "dial-up" modem. Alternatively, where the connection 1521 is a high capacity (eg: cable) connection, the modem 1516 may be a broadband modem. A wireless modem may also be used for wireless connection to the network 1520.

The computer module 1501 typically includes at least one processor unit 1505, and a memory unit 1506 for example formed from semiconductor random access memory (RAM) and read only memory (ROM). The module 1501 also includes an number of input/output (I/O) interfaces including an audio-video interface 1507 that couples to the video display 1514 and loudspeakers 1517, an I/O interface 1513 for the keyboard 1502 and mouse 1503 and optionally a joystick (not illustrated), and an interface 1508 for the external modem 1516 and printer 1515. In some implementations, the modem 1516 may be incorporated within the computer module 1501, for example within the interface 1508. The computer module 1501 also has a local network interface 1511 which, via a connection 1523, permits coupling of the computer system 1500 to a local computer network 1522, known as a Local Area Network (LAN). As also illustrated, the local network 1522 may also couple to the wide network 1520 via a connection 1524, which would typically include a so-called "firewall" device or similar functionality. The interface 1511 may be formed by an Ethernet™ circuit card, a wireless Bluetooth™ or an IEEE 802.11 wireless arrangement.

The interfaces 1508 and 1513 may afford both serial and parallel connectivity, the former typically being implemented according to the Universal Serial Bus (USB) standards and having corresponding USB connectors (not illustrated). Storage devices 1509 are provided and typically include a hard disk drive (HDD) 1510. Other devices such as a floppy disk drive and a magnetic tape drive (not illustrated) may also be used. An optical disk drive 1512 is typically provided to act as another non-volatile source of data including media data for reproduction using the media browsers to be described. Portable memory devices, such optical disks (eg: CD-ROM, DVD), USB-RAM, and floppy disks for example may then be used as appropriate sources of data to the system 1500.

The components 1505 to 1513 of the computer module 1501 typically communicate via an interconnected bus 1504 and in a manner which results in a conventional mode of operation of the computer system 1500 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1510 and read and controlled in execution by the processor 1505. Intermediate storage of such programs and any data fetched from the networks 1520 and 1522 may be accomplished using the semiconductor memory 1506, possibly in concert with the hard disk drive 1510. In some instances, the application programs may be supplied to the user encoded on one or more CD-ROM and read via the corresponding drive 1512, or alternatively may be read by the user from the networks 1520 or 1522. Still further, the software can also be loaded into the computer system 1500 from other computer readable media. Computer readable storage media refers to any storage medium that participates in providing instructions and/or data to the computer system 1500 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1501. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1514. Through manipulation of the keyboard 1502 and the mouse 1503, a user of the computer system 1500 and the application may manipulate the interface to provide controlling commands and/or input to the applications associated with the GUI(s). Generally the GUIs include icons or regions that, when appropriately selected using either or both of the keyboard 1502 and mouse 1503, provide for user control of the application program to achieve a desired function. Particularly, the mouse 1503 typically affords two-dimensional positioning within a GUI and selection at a determinable location via user actuable switches 1530 and 1532 formed therein. In some instances the mouse 1503 includes a scroll wheel 1534 which, when actuated by the user, permits content within the GUI to be scrolled.

Whilst the computer system 1500 may be used to implement the browsing arrangements to be described, such may also be configured in and perhaps more suited to specific user devices of smaller size or limited application. Such specific user devices include, but are not limited to, portable/personal audio and/or video reproduction devices, for example utilizing MP3 or MPEG file formats, mobile telephone handsets, portable digital assistants, digital still and video cameras, and the like. Other devices of in which the arrangements may be configured also include printers, such as domestic style ink-jet printers. Such devices are typically characterised by relatively low graphics and computational capabilities. In such instances, the keyboard 1502 and mouse 1503 may have their functionality provided by a relatively small keypad, perhaps supplemented by a scroll wheel. Such may be configured on a remote control device, operatively coupled to the computer module 1501 by a wired or wireless (eg. radio frequency, or optical) link. The keypad may further be configured to detect finger movement of a user to cause a particular response, in a fashion similar to finger pad sensor popular on many notebook-style computers and other devices. The media browser application allows the user to view thumbnails representing media items in a collection. The thumbnails may be scaled down copies of still images or photos, scanned images or graphical images. Video items may be represented by a scaled down frame selected from the video. Text based items may show a filename or other salient information related to the document however, as discussed above, such may alternatively associated with a displayable image.

The media collection is browsed by displaying a subset from the collection and allowing the user to change the displayed subsection. Preferably, the items in the media collection have been arranged in a predetermined order. This allows the collection to be browsed in a forward or reverse direction in a manner consistent with the particular order. Since the list has been ordered, items will always appear in the same part of the collection relative to other items. Common ordering approaches include alphabetical based on the file name of the media item, date of creation or editing, file size, amongst others.

Figure 1:
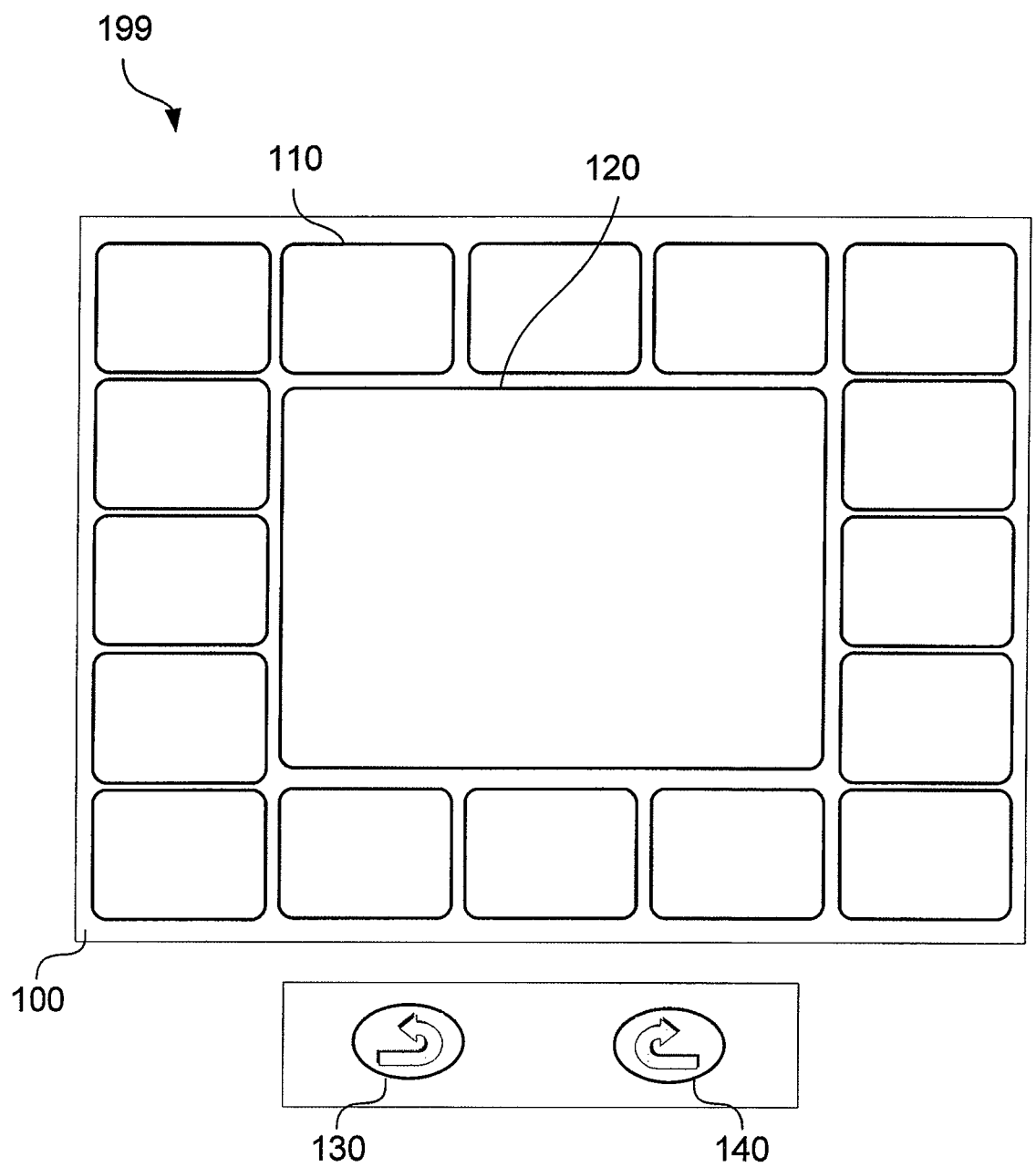
FIG. 1 is an illustration of the main components of the media browser according to the present disclosure.

FIG. 1 illustrates the main components of a media browser GUI 199 according to 20 the present disclosure. The GUI 199 includes a display area 100 configured to show thumbnail images corresponding to media items in a collection. One thumbnail, is shown at the central location 120 of the display area 100. Smaller thumbnails are shown at number of fixed locations 110 arranged in a loop around the larger thumbnail location 120. A user is able to advance through the media collection by pressing or selecting a button 130, and move back through the collection by pressing or selecting a button 140 to represent the thumbnails of the collection in the loop arrangement. The buttons 130 and 140 in this regard may be graphical buttons able to be selected on a touch screen or using the switches 1530 and 1532 of the mouse 1503, or physical buttons such as found on the keyboard 1502. This sequential or progressive stepping through the media collection is an example of user's action of scrolling the collection. Other input devices, such as the scroll wheel 1534 can be used to achieve the same scrolling result.

Figure 2A:
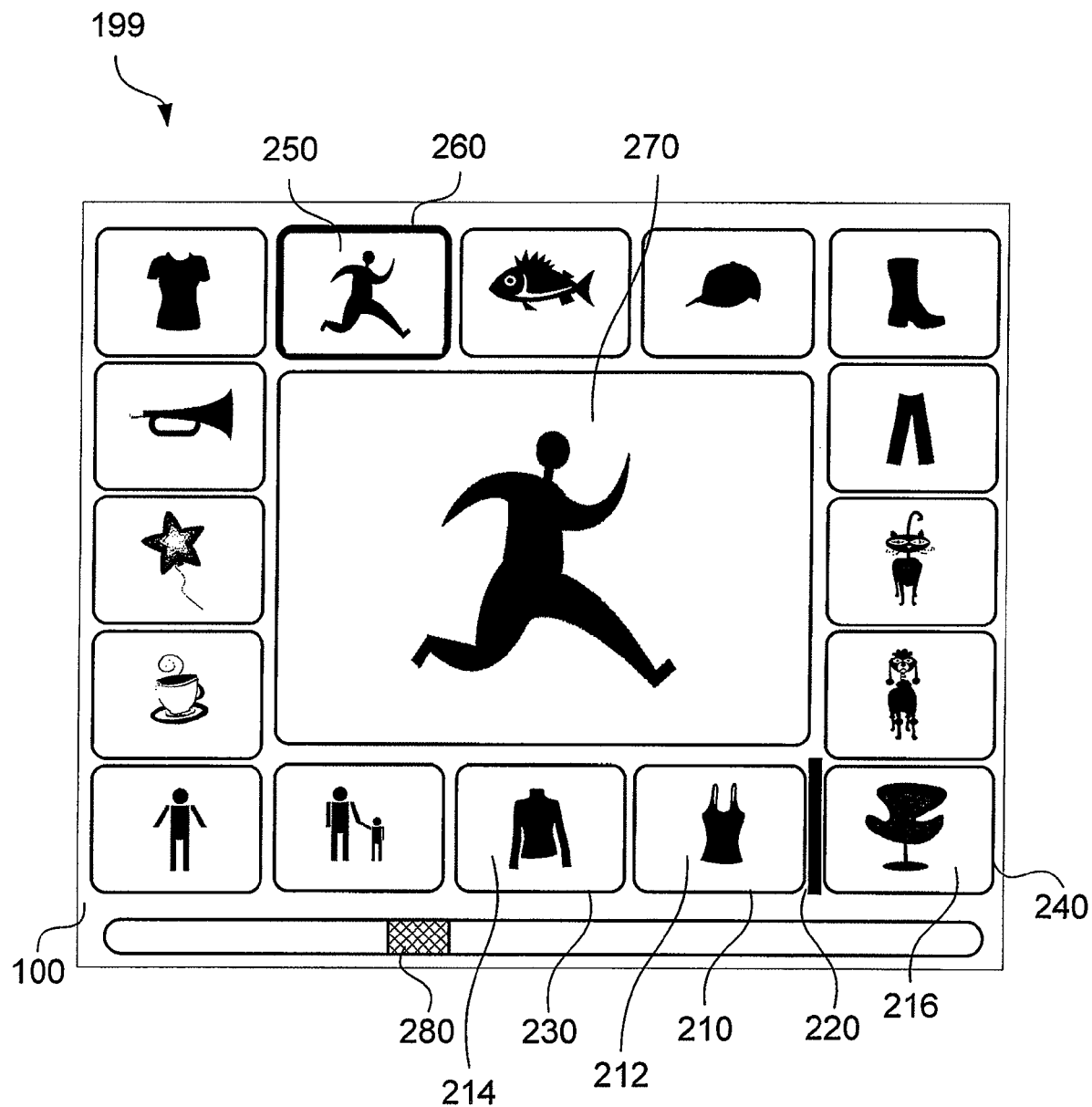
FIG. 2A is an illustration of the media view as displayed by the media browser of FIG. 1.

FIG. 2A illustrates an example view of a media browser application using the GUI 199 of FIG. 1. Image thumbnails are displayed in a loop within the fixed locations 110 of the display area 100. These thumbnails correspond to media items from a subsection (or subset) of the collection (set) of media items. A thumbnail (ie. singlet top image 212) in a location 210, corresponding to the first item in the subsection is displayed adjacent to an insertion point 220 in a clockwise direction. The insertion point 220 may be displayed as a bar or other visible marker between two fixed thumbnail locations in the loop sequence of thumbnails. A thumbnail (ie. sleeved top 214) corresponding to the next media item in the subsection, is displayed in a location 230 adjacent to thumbnail location 210. Similarly, the remaining thumbnails corresponding to the subsection from the collection are displayed sequentially in a clockwise direction around the various locations 110. A thumbnail (chair 216) corresponding to the last item in the subsection able to be displayed is displayed in a location 240 adjacent to the first thumbnail 210, thereby completing a looping arrangement.

One thumbnail 250 is identified as a focus thumbnail. Preferably, there are a fixed number of thumbnails and thumbnail locations between the focus thumbnail 250 and the insertion point 220. Further, the focus thumbnail 250 is preferably identified at a location approximately halfway through the loop so that the focus location is substantially opposite the insertion point 220. The focus thumbnail corresponds to a focus media item represented in the GUI 199 about which the attention of the user is intended to focus their attention upon.

The focus thumbnail 250 may be distinguished from other thumbnails in the loop so that the user can clearly identify which thumbnail is the focus. For example, it may be distinguished by setting a border 260 to a different colour.

A relatively larger image, described herein as the preview image 270 is displayed in the location 120, and contains the same image as the focus thumbnail 250. The larger image may be another (thumbnail) representation associated with the relevant media item (eg. at a higher resolution to that of the focus thumbnail 250). Since the preview image 270 is larger, the user can view more detail compared to the relatively small focus thumbnail 250.

Additionally, an indicator such as a scroll bar 280, may be optionally incorporated into the GUI 199 to show the position of the displayed subsection in relation to the complete collection. The scroll bar indicates the relative position of the focus item. This allows the user to understand which part of the collection is being viewed.

Figure 2B:
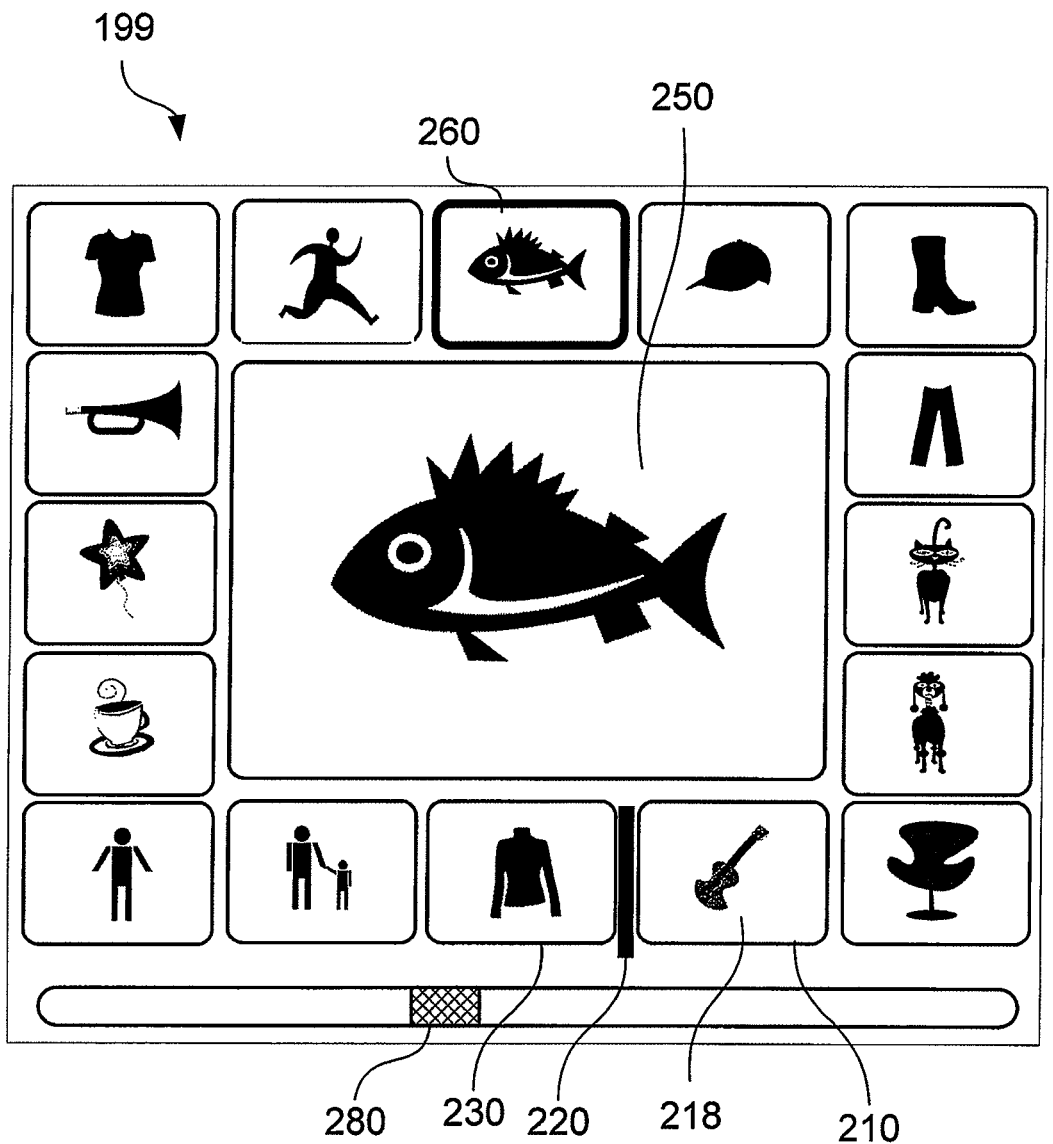
FIG. 2B is an illustration of the updated media view as displayed by the media browser of FIG. 1 following the processing step described in FIG. 3.
Figure 3:
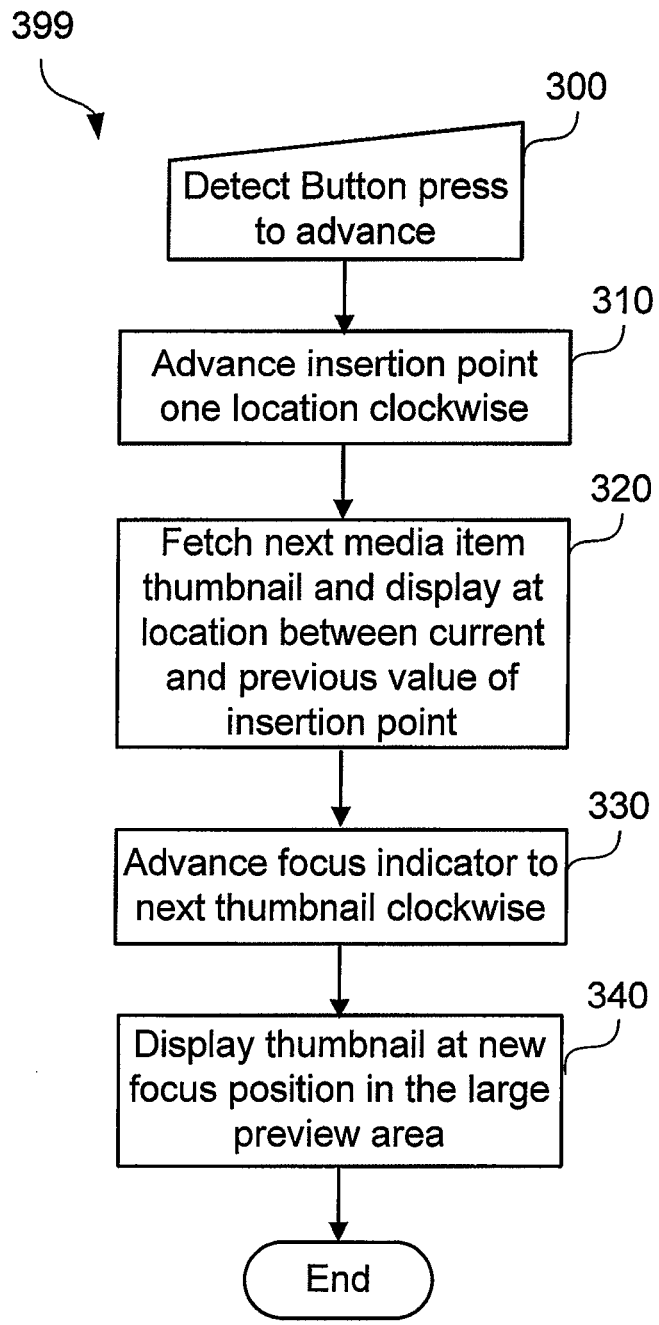
FIG. 3 is a schematic flow diagram illustrating a method of advancing to the next media item thumbnail.

When an input device is activated, such as button 130, the contents of the display of the GUI 199 are changed in the manner described in FIG. 3. The updated display is shown in FIG. 2B.

FIG. 3 shows a method 399 by which the GUI 199 is updated. At step 300, the GUI application detects the user selection of the button 130, by which the user desires the GUI 199 to advance to the next media item. Responding to this detected user action, the follow steps are taken. At step 310, the insertion point 220 is advanced one position clockwise so that is between thumbnail locations 230 and 210. At step 320, the thumbnail (ie. ukulele 218) corresponding to the next media item beyond the currently displayed subsection is obtained from the media collection (eg. stored in the HDD 1510, ODD 1512) and used to overwrite (ie. remove and replace) the thumbnail 212 previously represented in location 210. This is the thumbnail located between the current and previous values of the insertion point 220, as will be appreciated by comparing FIGS. 2A and 2B. At step 330, the focus thumbnail is changed to that thumbnail residing in the next thumbnail location in the clockwise direction. This is indicated to the user by changing the border properties of the thumbnails at the previous and new focus position, as seen by the thumbnail at the location 260 in FIG. 2B. At step 340 the larger preview thumbnail location 120 is updated to show the same image 250 as the new focus thumbnail. The scroll bar indicator 280 is updated to reflect the new subsection position being displayed.

By performing the described steps, the GUI display 199 has been updated as seen in FIG. 2B to reflect the new subsection from the collection. Notably, by comparing FIGS. 2A and 2B, it will be observed that only four changes are made in the GUI 199. Firstly, the border of the focus item has been advanced to the thumbnail 260 and secondly the large preview 250 has been correspondingly updated. Thirdly the insertion point 220 has been repositioned and fourthly the thumbnail in the location 210 has been changed from the singlet top seen in FIG. 2A to the ukulele shown in FIG. 2B. None of the other thumbnails has changed position or content. As a consequence, the computational demands of updating the GUI 199 during scrolling are significantly reduce when compared to traditional "filmstrip" browsers, where all thumbnails are updated in at least one of content and position. In the present arrangements ignoring the focus position change, only two thumbnails actually change in the GUI.

The above operations may be applied in an anti-clockwise direction to allow the user to move backwards through the collection, for example by detecting selection of the button 140.

It will be understood that these steps relate to displaying a subsection within a main part or body of the collection. Some modification to these steps may be desirable when displaying thumbnails corresponding to or near the start or end of the collection.

In some circumstances it will be appropriate to wrap the ends of the displayed collection. In this case, no modification is required. If the focus thumbnail corresponds to the first item in the collection, some thumbnails are displayed from the end of the collection along with some images from the start of the collection.

In the case where it is not desirable to display the collection in a wrapping manner, the following method is described.

When advancing through the collection, the insertion point and focus thumbnail may not be at a constant offset relative to each other. When near the start, the insertion point will remain at the position corresponding to the thumbnail for the first media item in the collection. The focus indicator moves as previously described. When the focus indicator has moved sufficiently, the insertion point will also move and new thumbnails will be displayed. It is preferred that this occurs when the focus is opposite the insertion point as described in FIG. 3.

When approaching the end of the collection, the insertion point will stop moving and no new thumbnails will be displayed. The focus will continue to move until the last thumbnail in the collection is reached and focussed upon. The GUI application will then ignore button presses to advance, as the end of the collection has been reached.

Similar steps also apply when moving backwards through the collection.

Figure 4A:
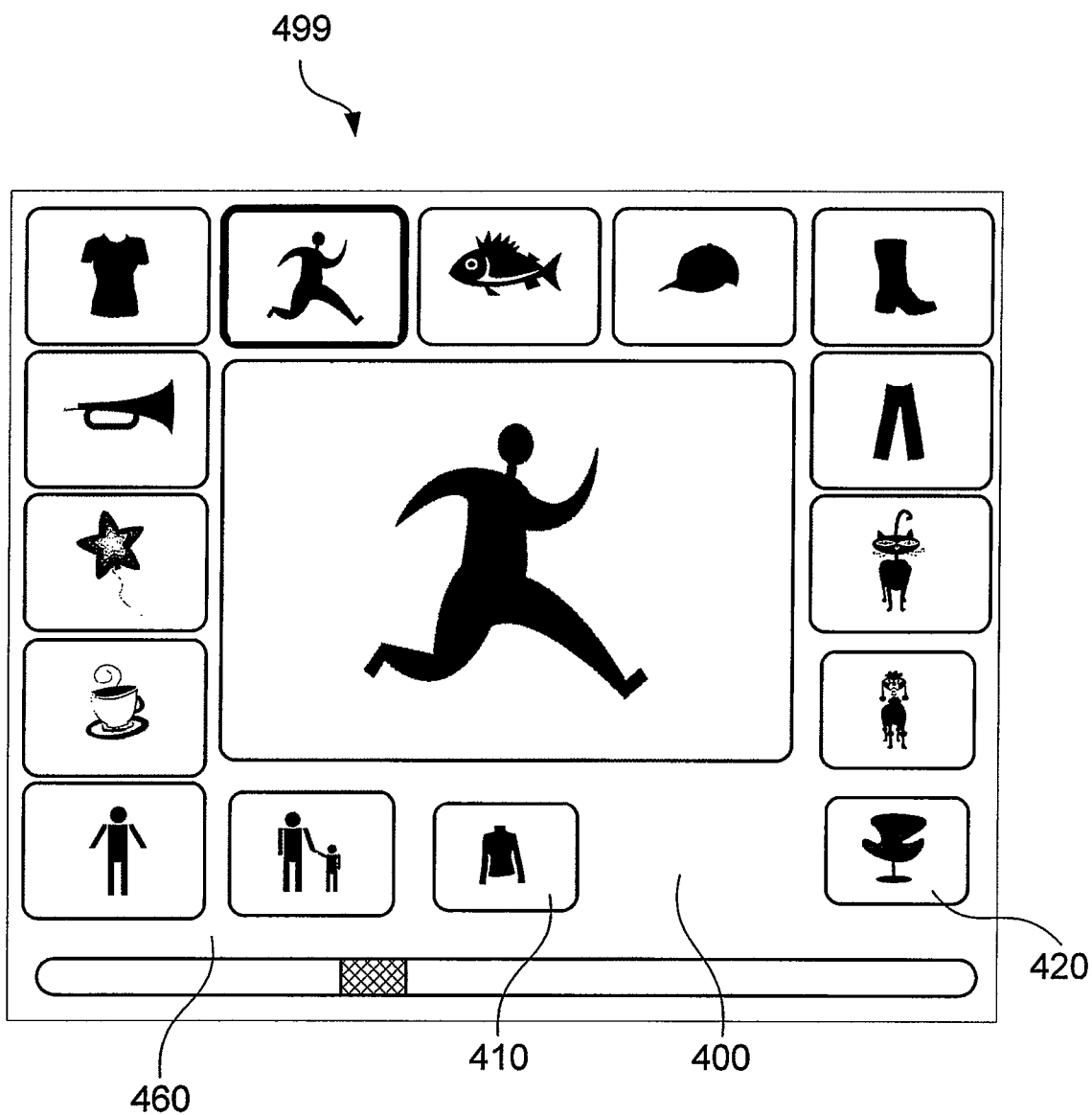
FIG. 4A is an illustration of the media view as displayed by an alternate media browser.
Figure 4B:
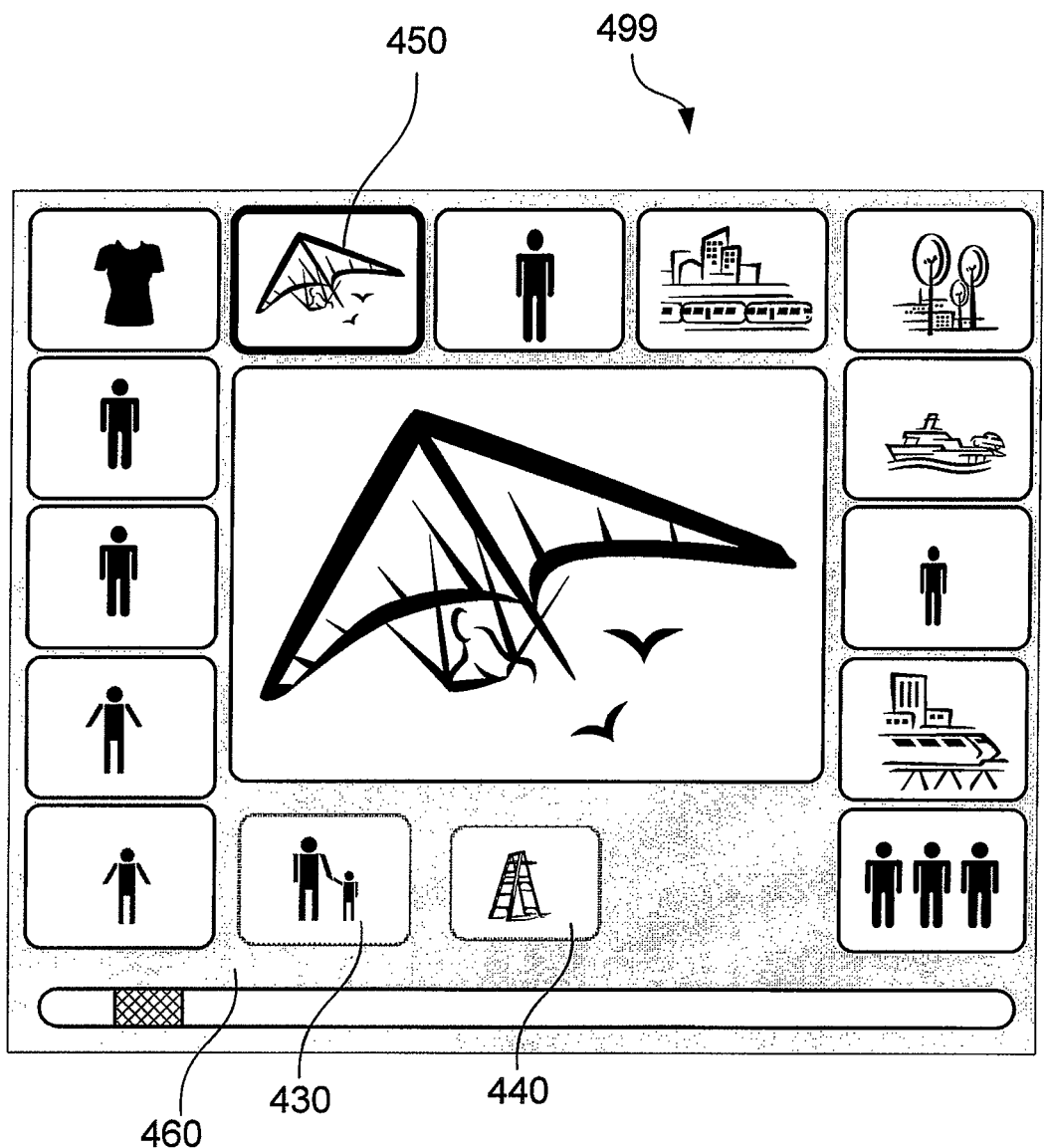
FIG. 4B is an illustration of the media view as displayed by the media browser of FIG. 4A that indicates the current direction of the scrolling action.

FIGS. 4A and 4B illustrate an alternative insertion point presentation.

FIG. 4A shows a GUI 499 by which the previously described insertion point is identified by a gap or space 400, between a first thumbnail location 410, and a last thumbnail location 420. A background colour of the display space 460 within which the thumbnails and scroll bar are presented may be configured to change gradually from one colour to another as the user scrolls from the start of the collection to the end of the collection. This change may be used to provide visible feedback on the position of the focus item in relation to the entire collection. This will be seen by comparing FIGS. 4A and 4B observing the changed position of the scrollbar and the changed thumbnails of the collection being displayed in the GUI 499. The background colour may be configured to change a single colour shade from light to dark, or to change from one colour to another. Left to right and/or up to down blends may also be used. Such feedback in background colour may be used instead of, or in addition, to a scroll bar such as that previously described.

Additionally, the presentation of the thumbnails may vary. Thumbnails near the insertion point may have a smaller size (seen in FIGS. 4A and 4B) or have some transparency (as seen in FIG. 4B). In the implementation of FIG. 4B, the thumbnails 430, 440 near the insertion point at the trailing end of the current scrolling direction—the clockwise direction—gradually decrease in size and become more transparent.

Figure 4C:
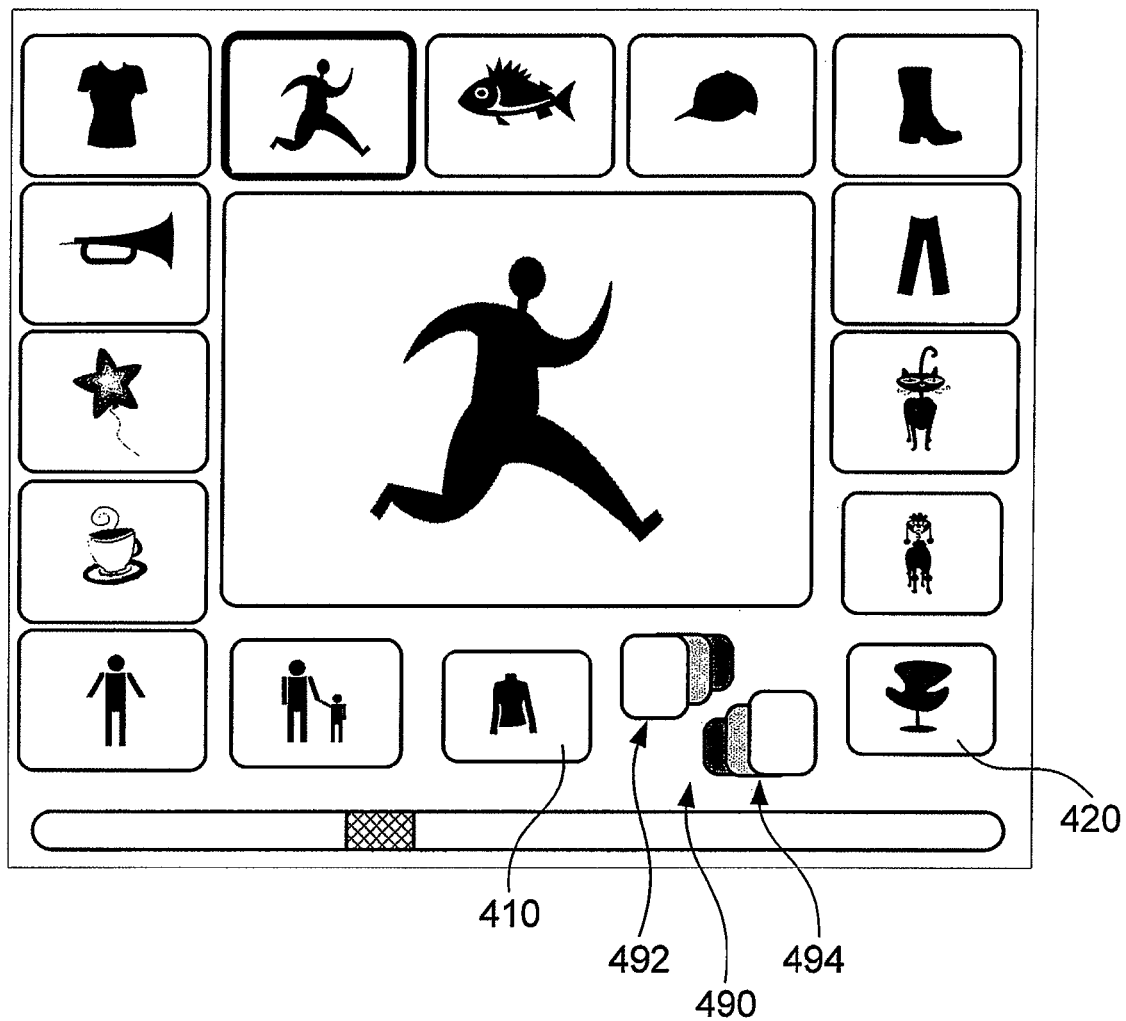
FIG. 4C is an illustration of another form of transition in another browser.

FIG. 4C shows a further insertion point representation 490 including two stacks 492 and 494 of diminishing size thumbnail representations. The stacks 492 and 494 are configured to represent the extensions of the collection not purposively shown in the looping arrangement. Further the stacks 492 and 492 represent those relatively proximal thumbnails (492) about to enter display in the looping arrangement, and those thumbnails (494) that have recently departed from display in the looping arrangement, as a consequence of scrolling operations.

Figure 5:
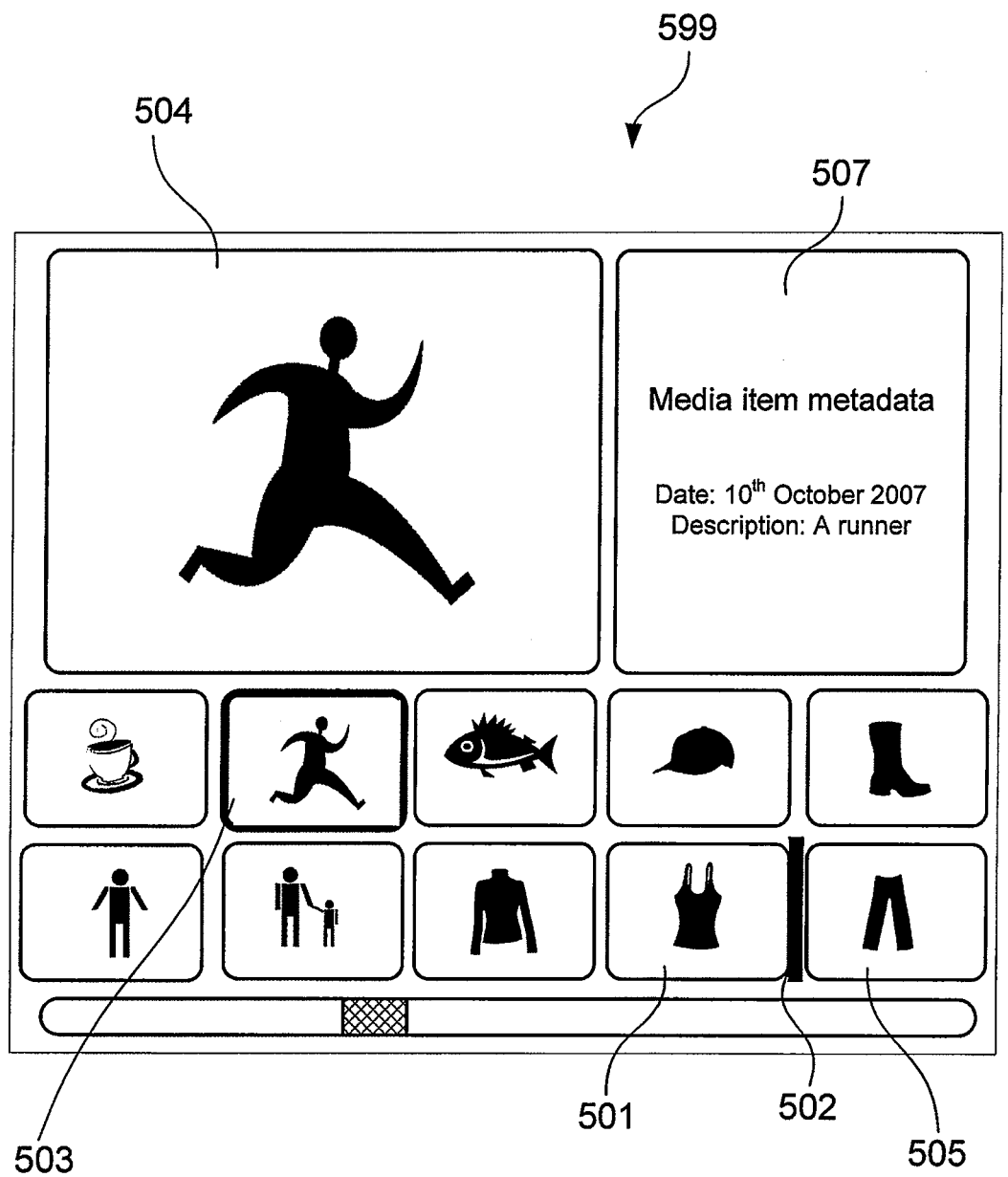
FIG. 5 is an illustration of the media view as displayed by another media browser.

FIG. 5 illustrates an alternative thumbnail layout of a GUI 599. The thumbnail loop previously described may be presented adjacent to a large preview 504, rather than surrounding the large preview 270. In this example, the loop arrangement is represented by two adjacent rows of thumbnail images arranged such that scrolling the media collection cycles the thumbnails along and around the rows as if they were a relatively circular loop, like the looping arrangement seen in FIG. 1 for example. The rows in FIG. 5 may be considered a squashed representation of the displayed loop of FIGS. 1 to 4. The loop of FIG. 5 includes a first thumbnail location 501, insertion point indicator 502, last thumbnail location 505 and focus thumbnail 503 are shown below the preview thumbnail, 504. It will further be appreciated that whilst FIG. 2 (for example) shows a loop configuration of the thumbnails, and describes circularised (looping) movement of the various focus and insertion points, the arrangement of FIG. 5 nevertheless provides for a looping arrangement arising from the functional movement of the insertion point 502 and focus item 503, even though the two rows of thumbnails in FIG. 5, of themselves, do not appear to show a loop. More than two rows may also be used.

FIG. 5 also shows that, with this revised looping configuration, that metadata 507, associated with the focus thumbnail, may also be conveniently displayed.

Figure 7:
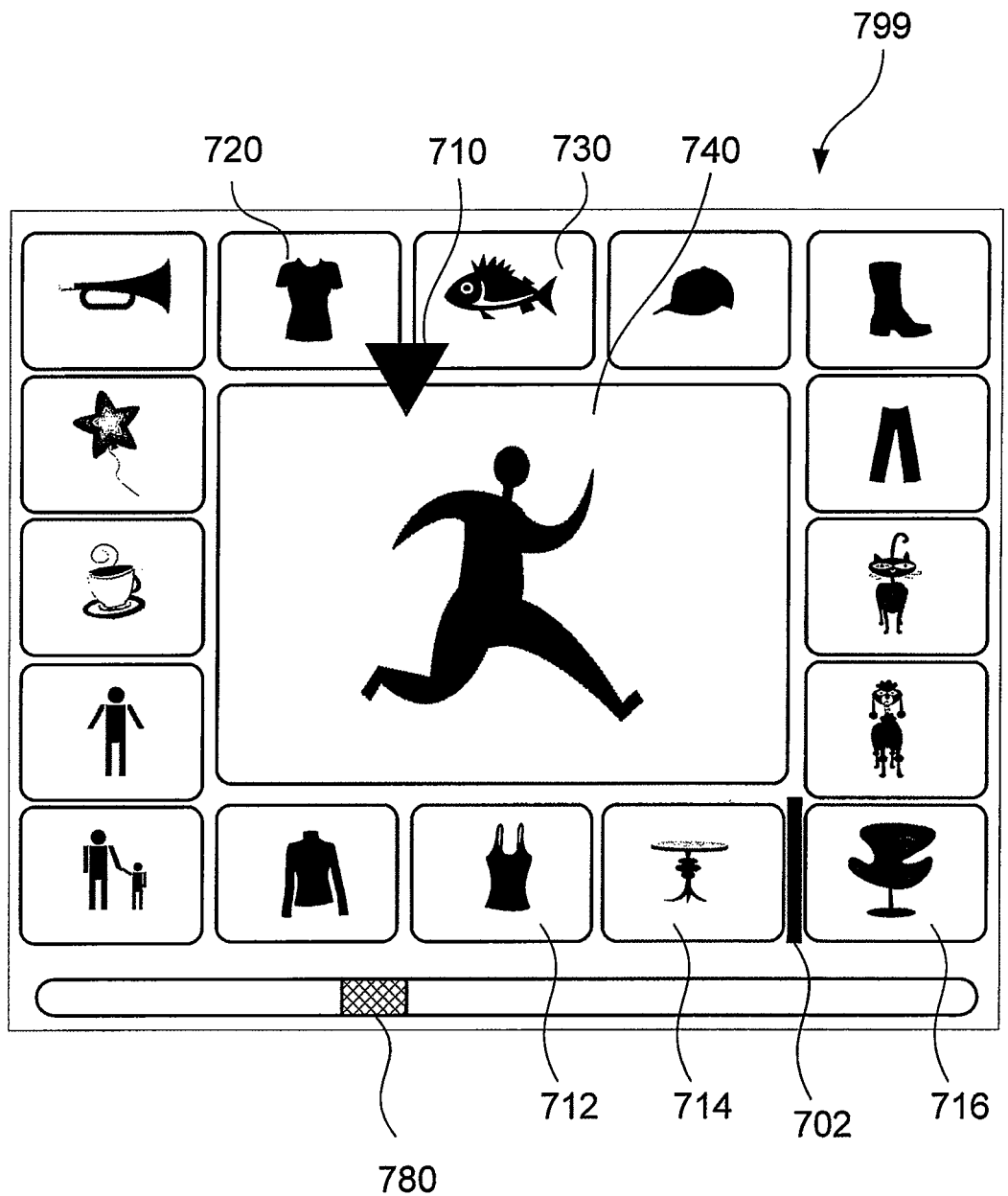
FIG. 7 is an illustration of the media view as displayed by media browser implementing the process of FIG. 6.

FIG. 7 illustrates an alternative presentation method using a GUI 799. In this implementation, instead of displaying a larger copy of a focus thumbnail, the focus thumbnail is always displayed as the large thumbnail without a corresponding small thumbnail. This is achieved by swapping the images displayed on one side of a swap position with the large preview as follows. In this implementation, the focus thumbnail or media item is defined or otherwise established by a swap position.

As seen in FIG. 7, an indicator 710, hereafter referred to as a swap position indicator, is used to identify the swap position within the GUI 799. The indicator 710 is shaped in this example as an inverted equilateral triangle, is located at a fixed number of thumbnail locations from the insertion point 702. Preferably this is approximately half way through the loop so that the location of the swap position indicator 710 is substantially opposite the insertion point 702.

Figure 6:
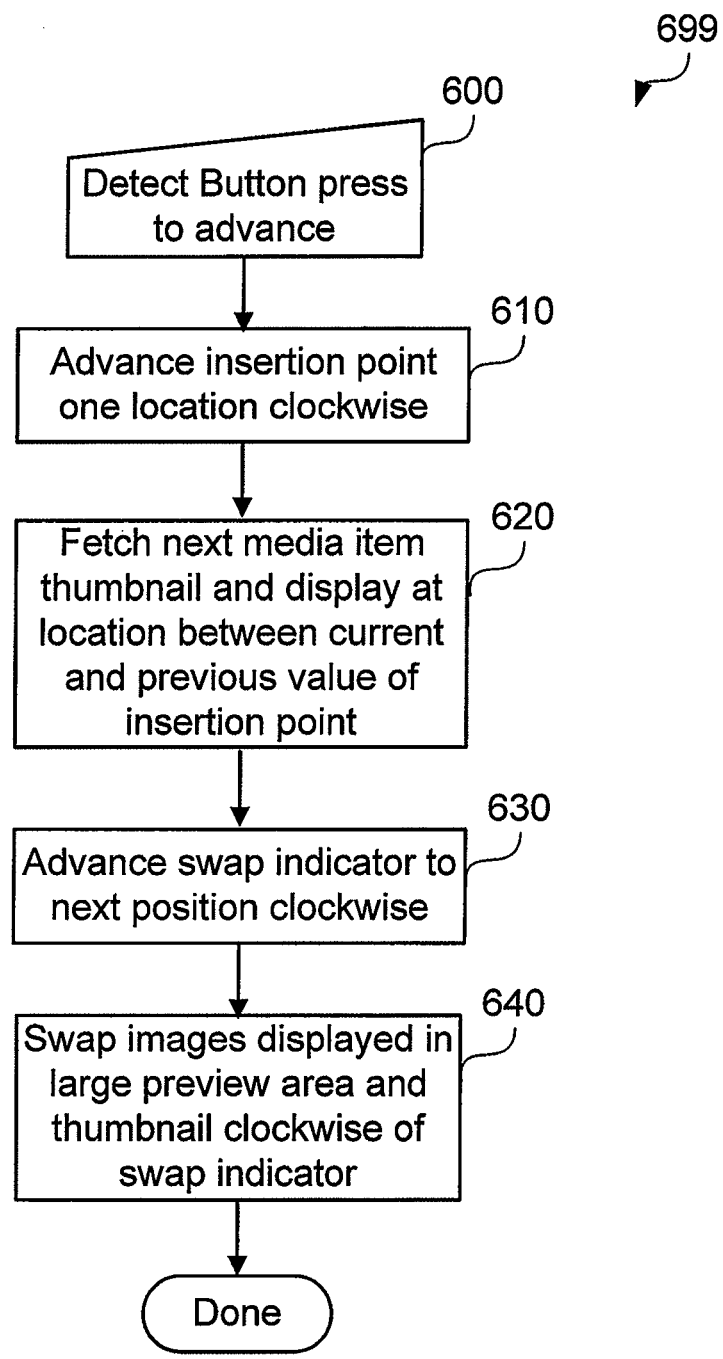
FIG. 6 is a schematic flow diagram illustrating another method of advancing to the next media item thumbnail.

When an input device is activated, such as the button 130 (not illustrated in FIG. 7), the contents of the GUI display 799 are changed according to a method 699 as described in FIG. 6. Steps 600, 610 and 620 are the same as described and correspond with steps 300, 310 and 320 of FIG. 3. At step 600 in FIG. 6, the GUI application detects the user selection of the button 130, in order to advance to the next media item. In response to this detected user event, the follow steps are taken. At step 610, the insertion point 702 is advanced one position clockwise so that it moves from between thumbnail locations 714 and 716 as seen in FIG. 7, to a location between thumbnails locations 712 and 714. This is ahead of the location 714 in the current scrolling direction. At step 620, the thumbnail corresponding to the next media item beyond the current subsection, subset or portion of the set of media items is obtained and used to remove and replace (overwrite) the thumbnail in location 714. This is the thumbnail located between the current (new) and previous values of the insertion point 702, and in this respect behind the insertion point in the scrolling direction. At step 630, the swap position indicator 710 is advanced one position clockwise. At step 640 the larger preview thumbnail 740 is updated to show the same image as the thumbnail location 730, which had been advanced over by the swap position indicator. Thumbnail location 730 is updated to display the image which had previously been displayed by the large preview location 740. The scroll bar indicator 780, is updated to reflect the new subsection position being displayed.

The above operations may be applied in an anti-clockwise direction to allow the user to move backwards through the collection. In this case, the thumbnail in location 710 is swapped with the large preview location 740.

The previously described method for processing items near the start and end of the media collection also applies to this presentation method.

As a further alternative, the swap position indicator 710 may be omitted and the thumbnails 720 and 730 being highlighted or otherwise showcased (by a bold border for example) to indicate that the focus position resides between those thumbnails.

The media view has been described with a single loop of small thumbnails. However, other arrangements may also be used.

Commonly, when navigating a large collection, it is desired to jump from one location to another. This can be done in several ways in relation to the GUIs described.

An additional input can be used to page (i.e. scroll on a "page" by "page" basis) through the collection. When a button is pressed or otherwise selected, all thumbnails on the display are updated in one operation. For example, if images 1 to 16 are being displayed, following the next page button-press, images 17 to 32 are displayed.

Summary thumbnails each representing a number of items, may be obtained from the collection and these may be used by the media browser application. The summary thumbnails may be selected at page intervals, for example every $16^{th}$ image.

Figure 8:
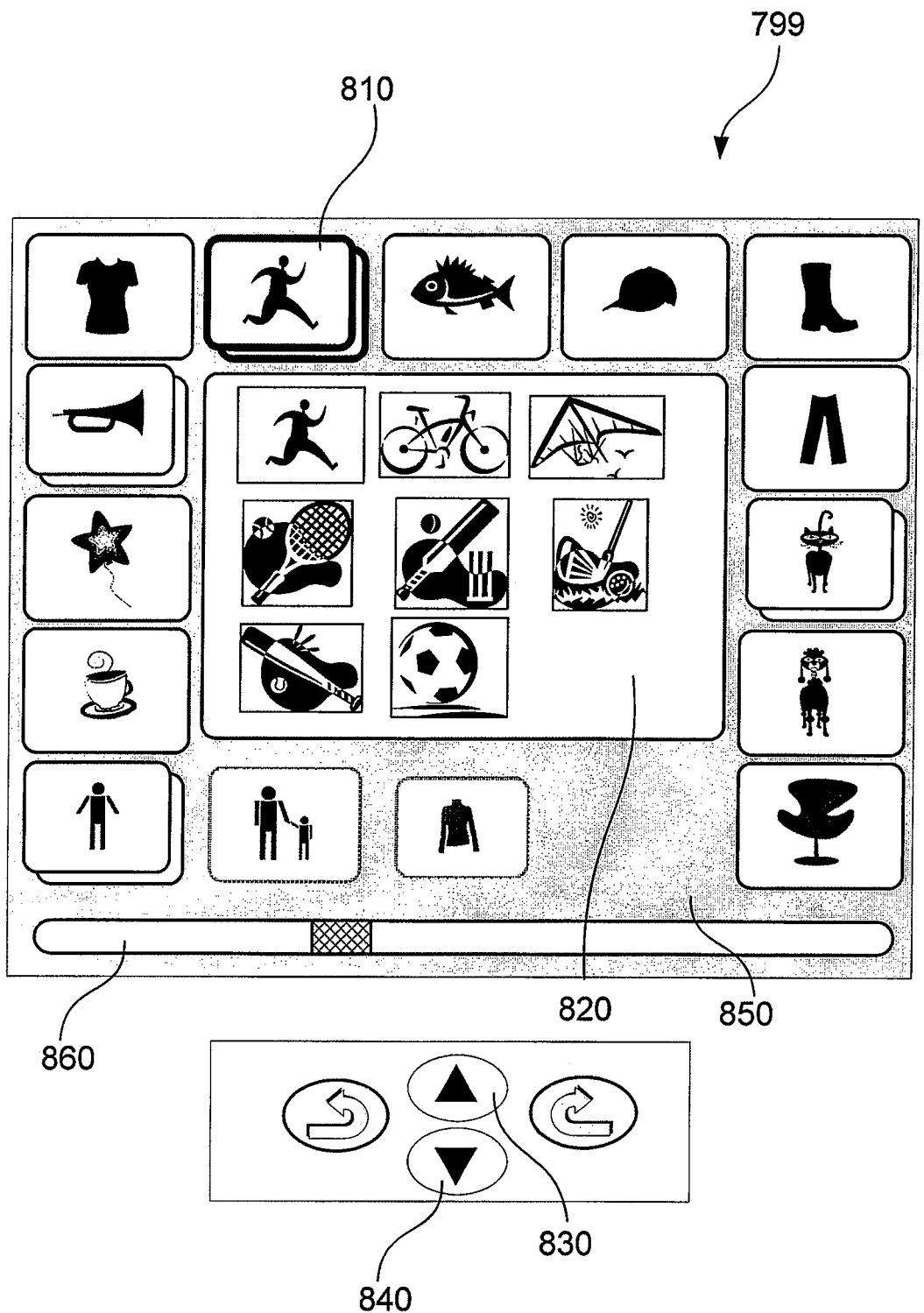
FIG. 8 is an illustration of the media view as displayed by a still further media browser when the focus item is a summary thumbnail.
Figure 9:
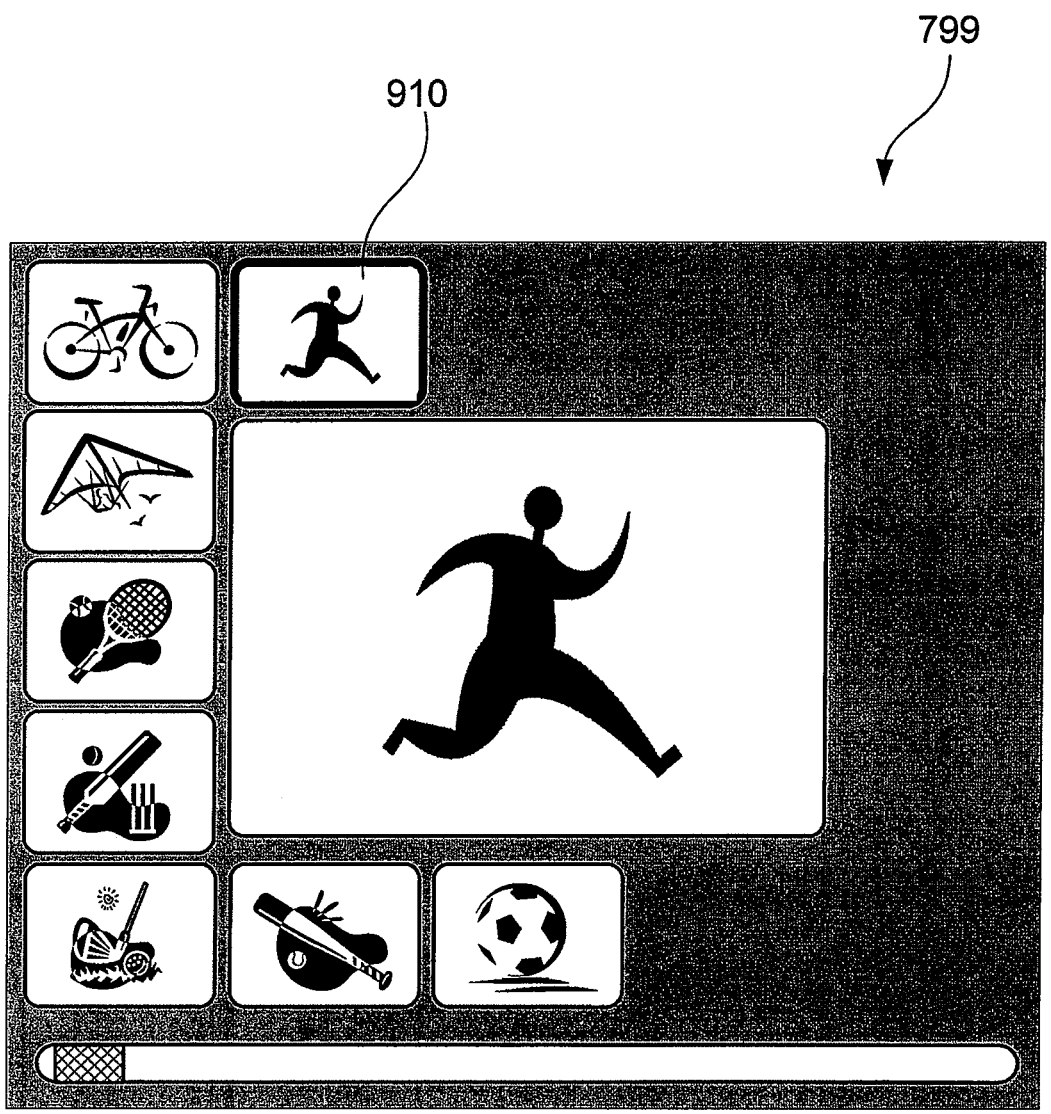
FIG. 9 is an illustration of the media view as displayed by the media browser when the summary thumbnail of FIG. 8 is selected.
Figure 9:
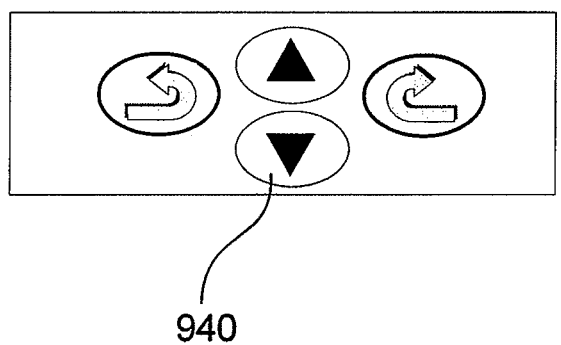

Alternatively, as in seen FIG. 8, a summary thumbnail 810 may represent a hierarchy of items. For example, a summary thumbnail may represent all the items from a certain year, month, or day, in a date ordered collection, and be expandable to show hierarchical components thereof. A corresponding preview image 820 of the summary thumbnail 810 may show a thumbnail essay or a sequence of images, snapshots or segments of the items or a representative subset of the items that the summary thumbnail 810 represented. A button 830 may be used to expand a summary thumbnail to its child thumbnails, which may be individual item thumbnails and/or further summary thumbnails. An animation may be associated with such expansion. For example, the expansion may be indicated by using a wipe style transition effect. The wipe may be configured to move radially in an outward direction from a centre of the large preview image 820 when moving down the hierarchy towards the hierarchical level at which only media items are to be found. FIG. 9 illustrates the result of selecting and expanding the summary thumbnail 810. The new focus item will occupy the same location as the previous focus item to avoid a loss of orientation. If a particular representative child item was used in the summary thumbnail 810, the same item will be given the focus 910; otherwise, the first child item of the summary thumbnail will be given the focus.

Figure 12:
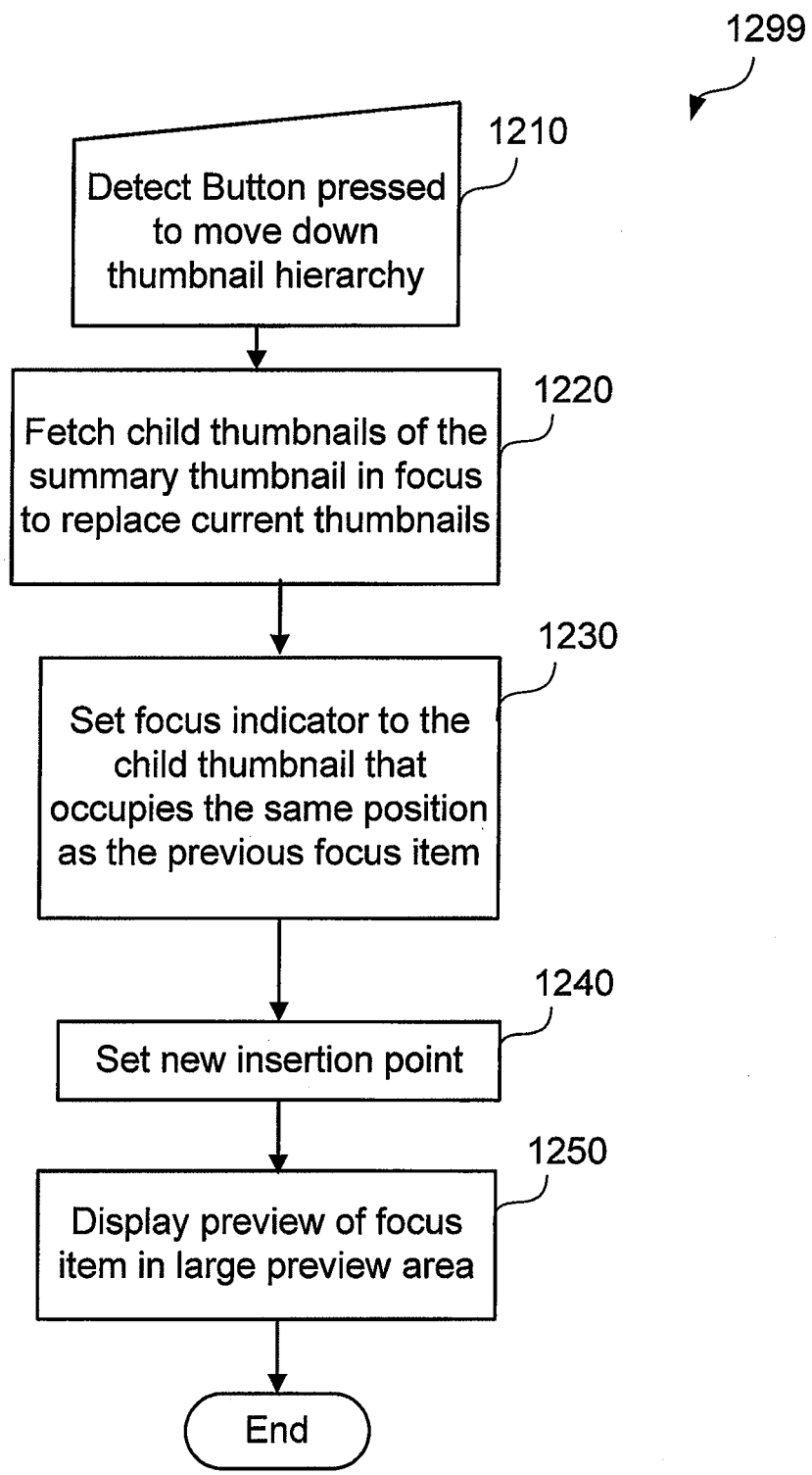
FIG. 12 is a flowchart of browsing down into a thumbnail hierarchy.

FIG. 12 is flowchart of a method 1299 that describes the process of moving down a thumbnail hierarchy when a summary thumbnail is the focus item. In step 1210, the application detects the selection of a button intended to expand the summary thumbnail and move down the thumbnail hierarchy. In step 1220, the thumbnails of the child items of the summary thumbnail are retrieved to replace the current set of thumbnails. One of the child items is given the focus in step 1230. As discussed earlier, this will either be the representative child item that was used in the summary thumbnail or the first child item. To avoid a loss of orientation, the position of the focus indicator remains unchanged. In step 1240, a new insertion point is set. The new insertion point is chosen to be as far from the focus indicator as possible on either side of the focus indicator. In step 1250, the preview of the child item currently in focus is displayed in the large preview area.

Returning to FIG. 8, another button 840 may be used to move up the hierarchy. The corresponding transition may be indicated by an inward wipe from the surrounding thumbnails to the central large preview image. The parent (summary thumbnails) of the previous focus item 810 will become the new focus item. Again, the location of the focus item remains unchanged to avoid a loss of orientation.

Figure 13:
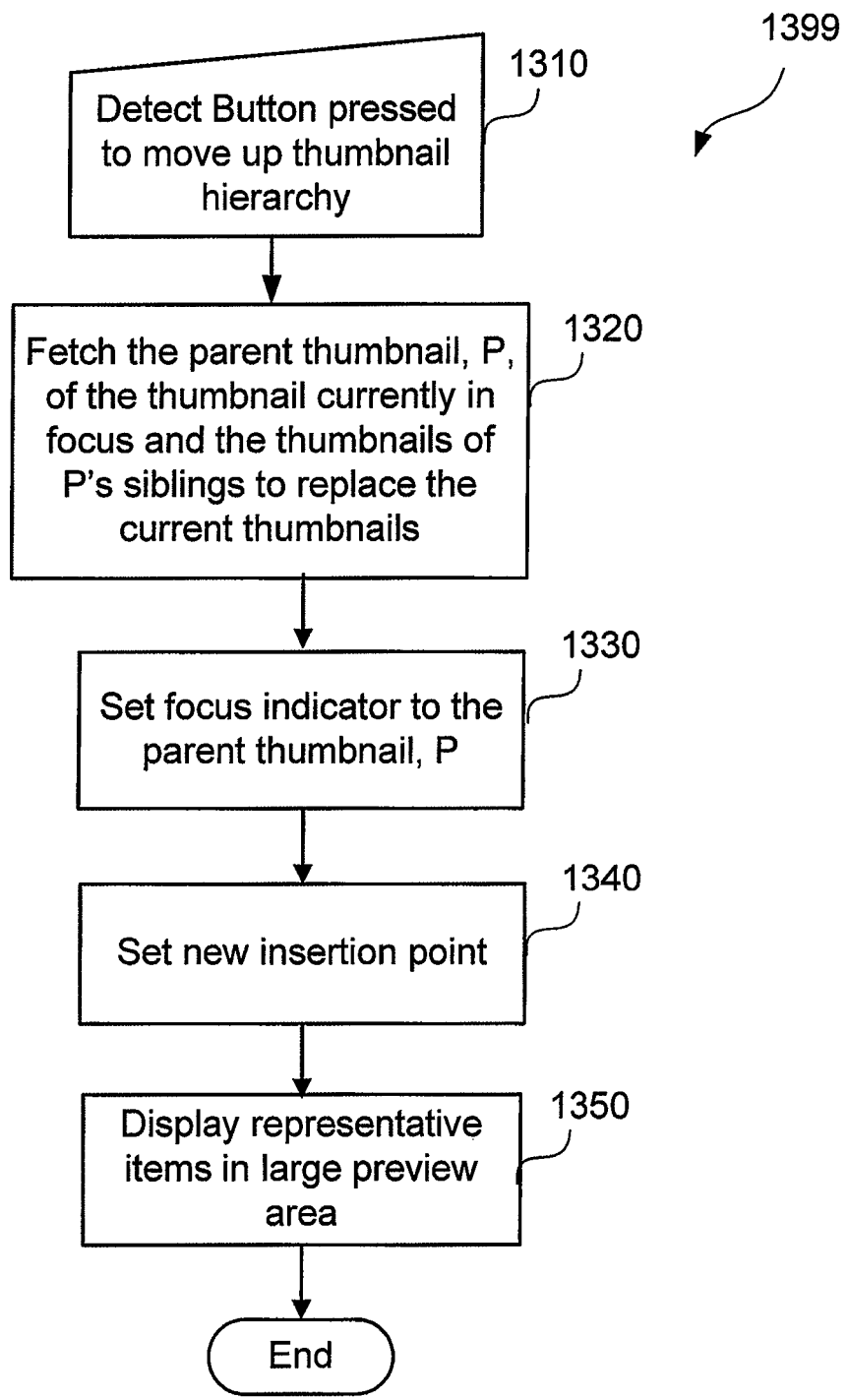
FIG. 13 is a flowchart of browsing up out of a thumbnail hierarchy.

FIG. 13 is a flowchart that describes a process 1399 of moving up a thumbnail hierarchy. In step 1310, the GUI application detects the selection of the button 840 to collapse the current thumbnails into their parent summary thumbnail to thereby move up the thumbnail hierarchy. In step 1320, the parent summary thumbnail, P, of the current items is retrieved along with the thumbnails of the siblings of P. The parent summary thumbnail P is given the focus in step 1330. To avoid a loss of orientation, the position of the focus indicator will remain unchanged. In step 1340, a new insertion point is set. The new insertion point is chosen to be as far from the focus indicator as possible on either sides of the focus indicator. In step 1350, a representative set of the child items of P are displayed in the large preview area.

Instead of a radial outward/inward wipe, expansion or contraction of summary thumbnails may be animated to expand/implode by pushing/merging with its neighbouring thumbnails sideways. A 3D rotational effect may also be used.

Text may be used to indicate the current hierarchy level. Alternatively, a background colour 850 may be used as visible feedback of the current depth of the focus item in the hierarchy while a scroll bar 860 is used to indicate the position of the focus item in the current branch of the hierarchy. A summary thumbnail may consist of multiple borders appearing as a stack to indicate multiple items are related to the summary thumbnail. A button may be used to toggle between a hierarchy view of the items and a flat view that collapses the hierarchical structure showing all the (non-summary) items in a single level.

Alternatively, two loops may be used. One loop may operate to display media thumbnails and a second to display summary thumbnails. Additional buttons may be used to move between the inner and outer loops. When advancing through the loop of summary thumbnails, the other loop of media thumbnails can be updated automatically.

Knowledge of the current position within the collection is important for the user, and has been described using a scroll bar. Alternative means of indication the current position are to use an indicator incorporated into the insertion point, focus indicator, large preview or background.

Figure 10:
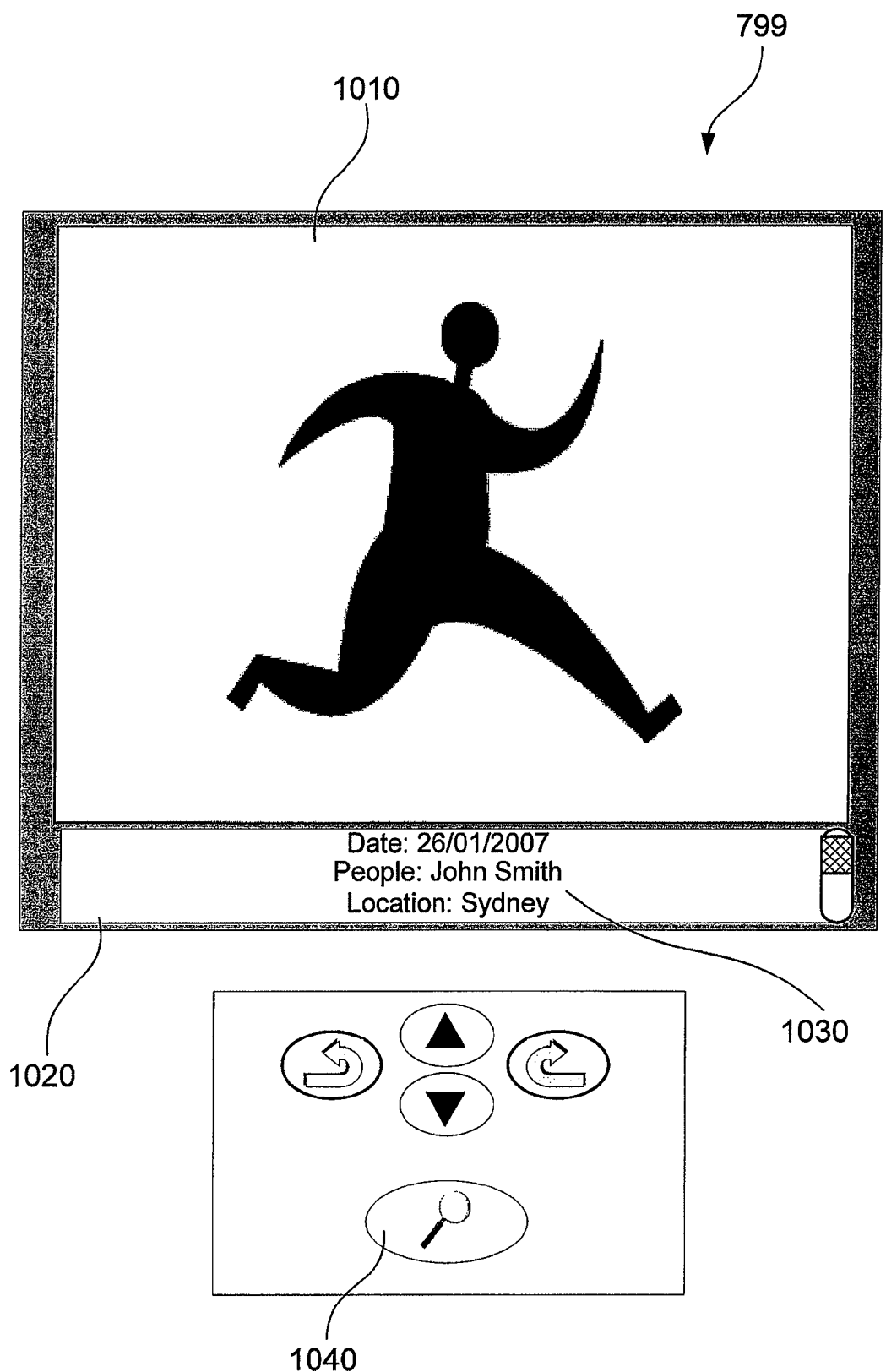
FIG. 10 is a media view of a media object selected from the GUI of FIG. 9.
Figure 11:
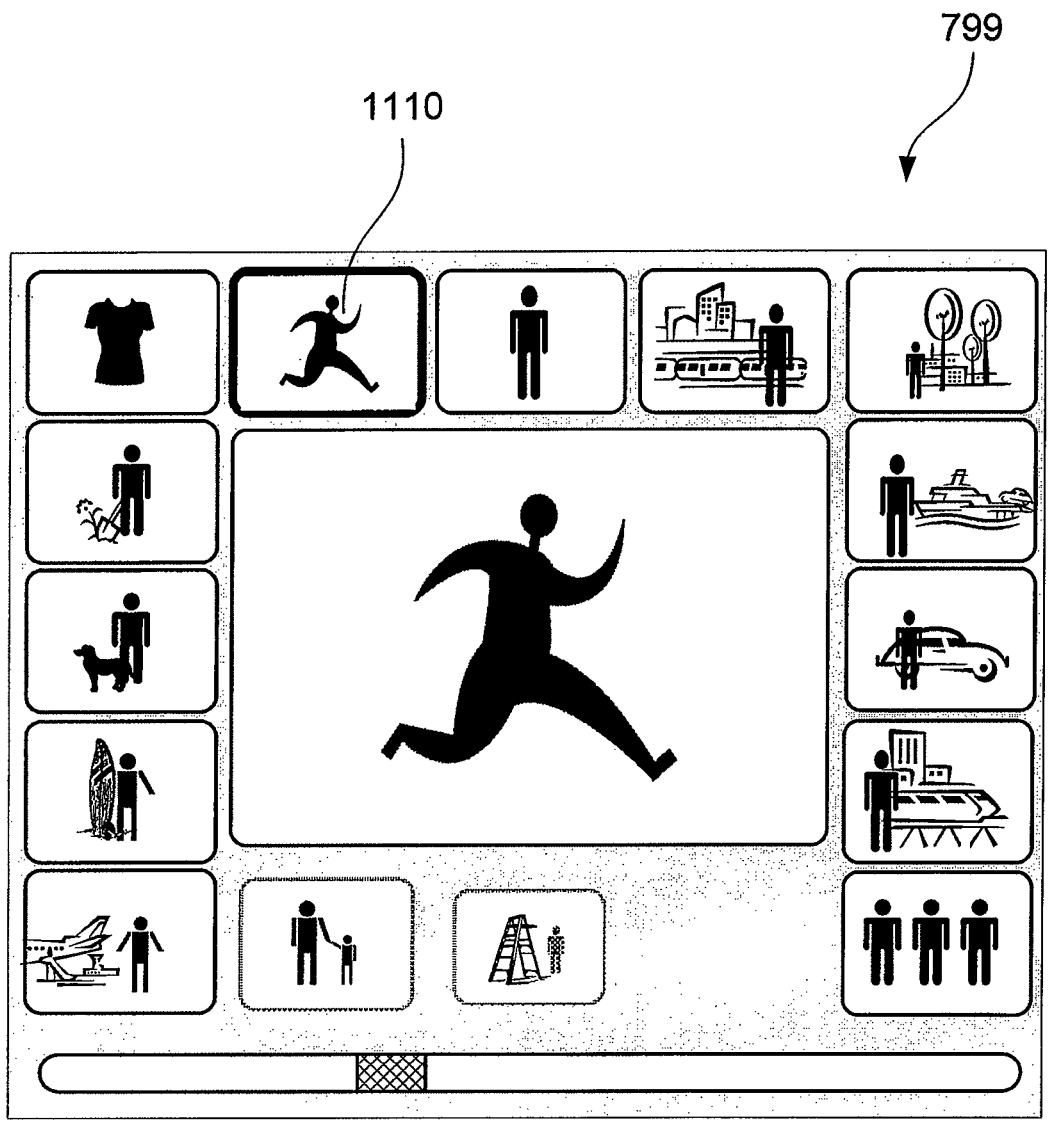
FIG. 11 illustrates the result of search originated from the view of FIG. 10.
Figure 11:
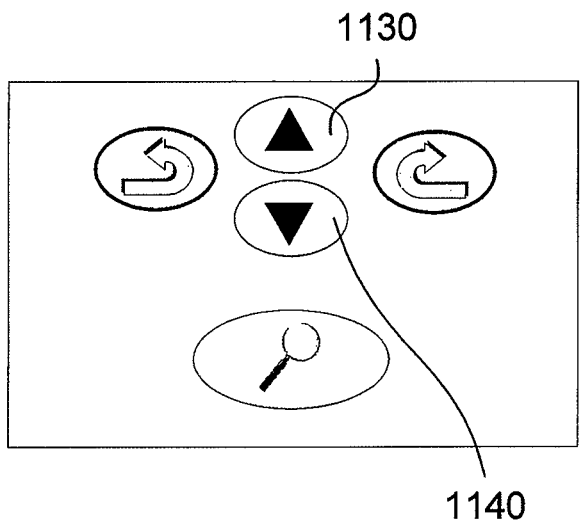

FIG. 10 illustrates the result of selecting, say, the item thumbnail 450 of FIG. 4B, or expanding an item thumbnail 910 of FIG. 9 by pressing a button 940. When the item thumbnail 910 is selected, the corresponding media item is rendered full-screen size 1010 alongside its metadata 1020 as seen in FIG. 10. The metadata 1020 displayed may be used for searching similar items. A user may browse through the metadata 1020 of the item, select a set of attributes 1030 (in this example "people" having a value of the person's name and a location). The user may then press a 'search' button 1040, revealed in the transition of the GUI 799 from the representation of FIG. 9 to that of FIG. 10, to search for similar items. FIG. 11 illustrates the result of such a search operation. Items with the same set of attributes 1030 in their metadata will be displayed (in this case "people" and "location"). The initial item whose metadata was used for the search will be made the focus item 1110.

In one implementation, searching for similar items creates a new hierarchical subsection of the collection for browsing. The search results of FIG. 11, which include items that satisfy all of the search attributes 1030, form one of the leaf nodes of the hierarchy. The other leaf nodes of the hierarchy are various combinations of the search attributes 1030, while the root node covers all the items that satisfy at least one of the search attributes of 1030. Nevertheless, to avoid creating a large number of combinations, an implementation may restrict itself to a subset of all possible combinations of the search attributes. For example, for a search with search attributes A, B and C, an implementation may choose to provide only four (overlapping) set of results as leaf nodes: a set of results that satisfies at least A, a set of results that satisfies at least B, a set of results that satisfies at least C and a set of results that satisfies all the attributes A, B and C. A user may use the buttons 1130 and 1140 to move up and down the hierarchy, as described earlier with the aid of FIG. 8, to explore the different sets of search results.

FIG. 14 is a flowchart of a method 1499 which describes the search process. As with the previous methods, such is also preferably implemented by software executable as part of the GUI application within the computer 1500. In step 1410, the application detects a user selection of a button by which the user desires to select a focus item. The selected item is rendered in step 1420 in the large preview area alongside its metadata. In step 1430, the application detects a user selection of a set of attributes of the item's metadata and a depression of a search button to search for similar items. The set of attributes selected for the search are referred to herein as the search attributes. All items that satisfy at least one of the search attributes are retrieved in step 1440. In step 1450, a thumbnail hierarchy is constructed from the retrieved item with each node of the thumbnail hierarchy comprising of retrieved items that match a different combination of the search attributes. In step 1460, the thumbnails of those retrieved items that match all the search attributes are displayed. In step 1470, focus is set to the first item and the insertion point is set to after the last displayed item. At the same time, the preview of the focus item—the first item in this case—is displayed.

The arrangements described herein may be used for video data. Video frames are displayed in sequence in the small thumbnail locations. By observing the central large preview area, the user can view the video using the advance and back buttons/keys and locate an individual frame of interest. Additional keys may be provided allow the user to automatically play, fast-forward, rewind and pause the video. This would be useful for video-editing operations for example.

The arrangements described above make use of a generally circular single loop to represent the described looping arrangement, as seen in FIGS. 2 to 4 for example. Whilst the row configuration of FIG. 5 may also be used to implement the looping arrangement of thumbnails, looping layouts or configurations may be used. For example, a figure eight (8) shaped (double) loop may be used, or an arbitrarily shaped loop may be used. The specifics of the displayed looping configuration are not critical, whilst however the looping arrangement of the thumbnail movement during scrolling is maintained.

INDUSTRIAL APPLICABILITY

The arrangements described are applicable to the computer and data processing industries and particularly for the browsing and searching of collections of media data, particularly image and video data.

The foregoing describes only some embodiments of the present invention, and modifications and/or changes can be made thereto without departing from the scope and spirit of the invention, the embodiments being illustrative and not restrictive.

We claim:

1. A method of browsing a set of media items in a graphical user interface represented on a display device, said method comprising the steps of:
   (a) displaying a sequence of thumbnails each corresponding to a media item of a portion of said set, said sequence being displayed around a preview region in a looping arrangement, the displayed sequence having a thumbnail insertion position that moves relative to a focus position, said focus position defining a focus media item of the set, wherein said focus media item is displayed in said preview region;
   (b) displaying a further thumbnail in said preview region, said further thumbnail corresponding to a first thumbnail currently in the focus position, without displaying said first thumbnail in said focus position;
   (c) responding to scrolling action of a user of said graphical user interface by:
   (i) advancing said focus position within the sequence from said first thumbnail to an adjacent second thumbnail in a scrolling direction associated with the scrolling action;
   (ii) removing from the display a third thumbnail that is immediately ahead of said insertion position in the scrolling direction;
   (iii) inserting and displaying in the sequence a fourth thumbnail ahead of said insertion position in the scrolling direction wherein said fourth thumbnail is next to the thumbnail immediately behind said insertion position in said sequence of thumbnails, said fourth thumbnail corresponding to a media item of said set not in the displayed sequence prior to the scrolling action;
   (iv) advancing said insertion position to a position just before said inserted fourth thumbnail; and
   (v) displaying a representation corresponding to the media item that
   corresponds to said second thumbnail in said preview region, having swapped said second thumbnail with said first thumbnail;
   wherein steps (i) to (v) are performed while maintaining positions of the remaining thumbnails of the displayed sequence on the display.

2. A method according to claim 1, wherein one or more thumbnails ahead of the insertion point are reduced in size and/or displayed with transparency to indicate the scrolling direction.

3. A method according to claim 1, wherein
   (1) said items form a hierarchy and said thumbnails comprise item thumbnails, each representing a single said media item, and summary thumbnails, each representing two or more media items;
   (2) said summary thumbnails are expandable upon detection of a second user action to move down said hierarchy to thereby display further summary and item thumbnails within the graphical user interface;
   (3) a representation of said thumbnails is updated on detection of a third user action to move up said hierarchy to display a sequence of thumbnails including the parent summary thumbnail of the focus media item.

4. A method according to claim 3, wherein when the focus media item comprises a summary thumbnail, the preview region displays a thumbnail essay of a subset of the media items represented by said summary thumbnail.

5. A method according to claim 3, wherein the focus media item is a summary thumbnail and the preview region displays a sequence of images, snapshots or segments of a subset of the media items represented by said summary thumbnail.

6. A method according to claim 3, further comprising displaying a scrollbar and a background colour within the graphical user interface to indicate a position of the displayed thumbnails among the set of media items represented by a summary thumbnail and a depth of the displayed items in said hierarchy of items.

7. A method of browsing a set of media items in a graphical user interface represented on a display device, said method comprising the steps of:
   (a) displaying a sequence of thumbnails corresponding to a portion of said items in a loop configuration around a relatively larger preview region, there being a thumbnail insertion position within the sequence that moves in relation to a swap position within the sequence, said swap position defining a focus media item of the set, wherein said focus media item is displayed in said preview region;
   (b) displaying a representation in said preview region of a media item that corresponds to a first thumbnail currently in the swap position without displaying said first thumbnail at the swap position;
   (c) responding to a scrolling action of a user of said graphical user interface by:
   (i) advancing said insertion position one position within the sequence in a scrolling direction associated with the scrolling action;
   (ii) removing from the display a second thumbnail that is immediately behind said insertion position in the scrolling direction;
   (iii) inserting and displaying in the sequence a third thumbnail behind said insertion position in the scrolling direction in place of said second thumbnail, said third thumbnail corresponding to a media item of said set not in the displayed sequence of thumbnails prior to the scrolling action;
   (iv) advancing said swap position in the sequence by one thumbnail in the scrolling direction to correspond with a fourth thumbnail in the displayed sequence;
   (v) swapping said fourth thumbnail with said first thumbnail to display said first thumbnail in the sequence; and
   (vi) displaying a representation of the media item that corresponds to said fourth thumbnail in said preview region;
   wherein steps (i) to (vi) are performed while maintaining positions of the remaining thumbnails of the displayed sequence on the display.

8. A method of browsing a set of media items on a display device, said method comprising the steps of:
   displaying a sequence of thumbnail images corresponding to a portion of said set in a looping arrangement;
   displaying a first thumbnail image of said sequence at a size larger than other thumbnail images of said sequence, wherein said looping arrangement around the first thumbnail image corresponds to a focus position in said sequence;
   and responding to a user action by: replacing display of a second thumbnail image adjacent to an insertion point in said displayed sequence with display of a third thumbnail image corresponding to a media item of said set not in the displayed sequence of thumbnail images prior to the user action;
   moving each of the focus position and insertion point in a particular direction along the sequence of thumbnail images;
   replacing a display of said first thumbnail image with display of a fourth thumbnail image corresponding to the moved focus position without displaying said first thumbnail in said focus position; and maintaining positions of the remaining thumbnail images displayed in the sequence.

9. A method according to claim 8, wherein the looping arrangement of thumbnail images is operative, as a result of the user action, so that at least one thumbnail image corresponding to a media item of the set not previously displayed is added to display in the portion, and a thumbnail image of a media item in the portion prior to the user action is removed from the displayed sequence, the addition and removal occurring substantially adjacent to the insertion point and without changing positions of thumbnails displayed elsewhere in the sequence.

10. A method according to claim 8, wherein the looping arrangement comprises a display of the sequence of thumbnail images laid out in one of a single loop, at least two rows, a figure eight loop, and an arbitrary loop.

11. A method according to claim 8, wherein the insertion point is represented in the display by a space between two thumbnails of the displayed sequence.

12. A method according to claim 11, wherein the space is occupied by a representation of thumbnails of other media items of the collection adjacent to the items of the displayed portion in the sequence.

13. A method according to claim 8, wherein said insertion point is identified by a displayed marker between two thumbnails of the displayed sequence.

14. A method according to claim 8, wherein one or more thumbnails associated in said looping arrangement with the insertion point are reduced in size and/or displayed with transparency to mark the insertion point.

15. A method of browsing a set of media items in a graphical user interface on a display device, said method comprising the steps of:
(a) responding to user action to select a media item by displaying a representation associated with the selected media item together with metadata associated with the selected media item;
(b) accepting user selection of a set of attributes of the displayed metadata of said selected media item;
(c) retrieving a subset of media items from said set, each media item of the subset having metadata that matches at least one attribute of said selected set of attributes;
(d) organizing said retrieved media items into a hierarchy with each node of the hierarchy representing media items that match a different combination of a subset of said selected set of attributes; and
(e) displaying a representation associated with each said retrieved item for browsing by:
displaying a sequence of representations corresponding to a portion of said set of media items in a looping arrangement;
displaying a first representation of said sequence at a size larger than other representations of said sequence, wherein said looping arrangement around the first representation corresponds to a focus position in said sequence;
responding to a user action by:
replacing display of a second representation adjacent to an insertion point in said displayed sequence with display of a third representation corresponding to a media item of said set not in the displayed sequence of representations prior to the user action;
moving the focus position and insertion point in a particular direction along the displayed sequence of representations;

replacing a display of said first representation with display of a fourth representation corresponding to the moved focus position without displaying said first representation in said focus position;
and maintaining positions of the remaining representations displayed in the sequence, wherein one or more representations associated in said looping arrangement with the insertion point are at least one of reduced in size and displayed with transparency to mark the insertion point.

16. A method of browsing a set of media items using a graphical user interface represented on a display device, said method comprising the steps of:
(a) responding to user action to select one said media item by displaying a representation associated with the selected media item together with metadata of the selected media item;
(b) identifying user selection of a set of attributes of the metadata of said selected media item;
(c) retrieving a subset of media items from the set each having metadata that matches all of said selected set of attributes;
(d) displaying said retrieved media items for browsing by:
displaying a sequence of representations of the media items in a looping arrangement;
displaying a first representation of said sequence at a size larger than other representations of said sequence, wherein said looping arrangement around the first representation corresponds to a focus position in said sequence;
responding to a user action by:
replacing display of a second representation adjacent to an insertion point in said displayed sequence with display of a third representation corresponding to a representation not in the displayed sequence of representations prior to the user action;
moving the focus position and insertion point in a particular direction along the sequence of representations;
replacing a display of said first representation with display of a fourth representation corresponding to the moved focus position without displaying said first representation in said focus position;
and maintaining positions of the remaining representations displayed in the sequence.

17. A non-transitory computer readable storage medium retrievably storing a program recorded thereon, the program being executable by computerized apparatus to browse a set of media items on a display device, said program comprising:
code for displaying a sequence of thumbnail images corresponding to a portion of said set in a looping arrangement;
code for displaying a first thumbnail image of said sequence at a size larger than other thumbnail images of said sequence, wherein said looping arrangement around the first thumbnail image corresponds to a focus position in said sequence; and code for responding to a user action by:
replacing display of a second thumbnail image adjacent to an insertion point in said displayed sequence with display of a third thumbnail image corresponding to a media item of said set not in the displayed sequence of thumbnail images prior to the user action;
moving the focus position and insertion point in a particular direction along the sequence of thumbnail images;
replacing a display of said first thumbnail image with display of a fourth thumbnail image corresponding to the moved focus position without displaying said first thumbnail in said focus position;

and maintaining positions of the remaining thumbnail images displayed in the sequence.

18. A non-transitory computer readable storage medium according to claim 17, wherein the looping arrangement of thumbnail images is operative, as a result of the user action, so that at least one thumbnail image corresponding to a media item of the set not previously displayed is added to display in the portion, and a thumbnail image of a media item in the portion prior to the user action is removed from the displayed sequence, the addition and removal occurring substantially adjacent to the insertion point and without changing positions of thumbnails displayed elsewhere in the sequence.

19. A computerized apparatus comprising a memory having a program stored therein, a display, an input device operable by a user, and a processor operatively coupled to each of the memory, the display and the input device, said program being executable by the processor to implement a graphical user interface for browsing a collection of media items at least accessible via said computerized apparatus, said program comprising:

code for displaying on the display a sequence of thumbnail images corresponding to a portion of said collection in a looping arrangement;

code for displaying on the display a first thumbnail image of said sequence at a size larger than other thumbnail images of said sequence, wherein said looping arrangement around said first thumbnail image corresponds to a focus position in said sequence; code for responding to a user action of the input device by:

replacing display of a second thumbnail image adjacent to an insertion point in said displayed sequence with display of a third thumbnail image corresponding to a media item of said collection not in the displayed sequence of thumbnail images prior to the user action;

moving the focus position and insertion point in a particular direction along the sequence of thumbnail images;

replacing a display of said first thumbnail image with display of a fourth thumbnail image corresponding to the moved focus position without displaying said first thumbnail in said focus position;

and maintaining positions of the remaining thumbnail images displayed in the sequence.

\* \* \* \* \*